United States Patent
Kodaka et al.

(10) Patent No.: US 8,479,898 B2
(45) Date of Patent: *Jul. 9, 2013

(54) WORK VEHICLE CONTROL DEVICE

(75) Inventors: Katsuaki Kodaka, Tsuchiura (JP);
Hidetoshi Satake, Ishioka (JP);
Kazuhiro Ichimura, Niihara-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/914,193

(22) Filed: Oct. 28, 2010

(65) Prior Publication Data

US 2011/0036674 A1    Feb. 17, 2011

Related U.S. Application Data

(62) Division of application No. 11/629,100, filed as application No. PCT/JP2005/010703 on Jun. 10, 2005, now Pat. No. 8,328,296.

(30) Foreign Application Priority Data

Jun. 10, 2004 (JP) ................... 2004-172209
Jun. 23, 2004 (JP) ................... 2004-184697

(51) Int. Cl.
*B60T 11/00* (2006.01)
*F16D 69/00* (2006.01)

(52) U.S. Cl.
USPC .............................. 188/353; 188/265; 303/89

(58) Field of Classification Search
USPC .................... 303/89, 191, 192, 198; 188/265, 188/353; 180/306
See application file for complete search history.

(56) References Cited

U.S. PATENT DOCUMENTS

| 1,969,056 | A | | 8/1934 | Wolfe et al. |
| 4,315,636 | A | | 2/1982 | Nakagawa |
| 4,669,566 | A | * | 6/1987 | Bergius et al. ............... 180/420 |
| 4,729,222 | A | | 3/1988 | Tanaka et al. |
| 4,894,654 | A | * | 1/1990 | Serenbetz ................. 340/932.2 |

(Continued)

FOREIGN PATENT DOCUMENTS

| EP | 1 426 207 A2 | 6/2004 |
| GB | 2 308 582 A | 7/1997 |

(Continued)

OTHER PUBLICATIONS

The Extended European Search Report dated Sep. 17, 2010 (Six (6) pages).

(Continued)

*Primary Examiner* — Melody Burch
(74) *Attorney, Agent, or Firm* — Crowell & Moring LLP

(57) ABSTRACT

The present invention includes a hydraulic brake device 4, 5 that generates a braking force corresponding to an operation of a brake pedal 1 performed while the vehicle is traveling, a brake lock means 6 for applying a hydraulic lock on the hydraulic brake device 4, 5 and releasing the hydraulic lock, a brake pedal operation detection means 22 for detecting an operation of the brake pedal 1, and a control means 10 for controlling the brake lock means 6 so as to apply the hydraulic lock on the hydraulic brake device 4, 5 upon detecting via the brake pedal operation detection means 22 a predetermined depressing operation of the brake pedal 1.

8 Claims, 14 Drawing Sheets

U.S. PATENT DOCUMENTS

| | | | |
|---|---|---|---|
| 5,161,862 A | 11/1992 | Kunz et al. | |
| 5,163,741 A | 11/1992 | Hsiu | |
| 5,431,607 A * | 7/1995 | Alder et al. | 477/4 |
| 5,655,820 A | 8/1997 | Kervagoret | |
| 5,919,243 A | 7/1999 | Huh | |
| 6,206,154 B1 * | 3/2001 | Chino et al. | 188/318 |
| 6,246,944 B1 | 6/2001 | Maruyama | |
| 6,332,654 B1 | 12/2001 | Yano | |
| 7,104,548 B2 | 9/2006 | Ichimura et al. | |
| 7,377,523 B2 * | 5/2008 | Schedgick et al. | 280/5.514 |
| 8,328,296 B2 * | 12/2012 | Kodaka et al. | 303/89 |
| 2003/0217899 A1 | 11/2003 | Tanaka | |
| 2005/0001481 A1 | 1/2005 | Kley et al. | |

FOREIGN PATENT DOCUMENTS

| | | |
|---|---|---|
| JP | S53-88925 U | 12/1951 |
| JP | 55-114610 A | 9/1980 |
| JP | 62-2472 | 1/1987 |
| JP | 62-258841 | 11/1987 |
| JP | 63-44873 | 3/1988 |
| JP | 63-061621 A | 3/1988 |
| JP | 02-003505 | 1/1990 |
| JP | 02-114046 | 4/1990 |
| JP | 5-52391 | 7/1993 |
| JP | 06-286446 | 10/1994 |
| JP | 09-030229 | 2/1997 |
| JP | 09-184169 | 7/1997 |
| JP | 11-236936 | 8/1999 |
| JP | 11-334550 | 12/1999 |
| JP | 2000-309256 A | 11/2000 |
| JP | 2004-142520 A | 5/2004 |
| WO | WO 98/01331 A1 | 1/1998 |
| WO | 02-090159 A1 | 11/2002 |

OTHER PUBLICATIONS

International Search Report mailed Aug. 16, 2005.
Supplementary European Search Report mailed Mar. 11, 2010.
European Office Action dated Apr. 13, 2011 (six (6) pages).

* cited by examiner

FIG.3
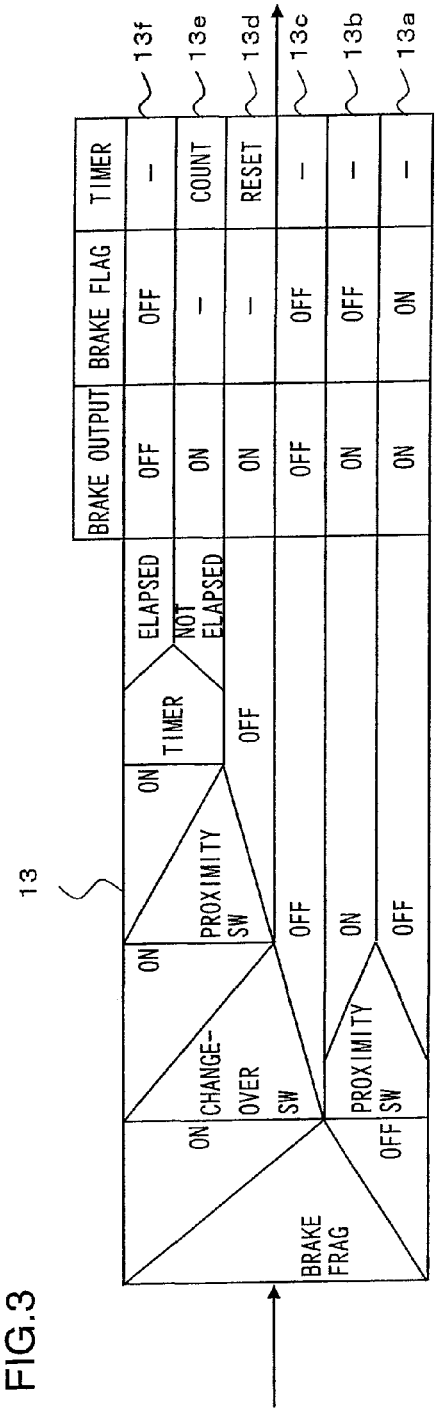
(a)
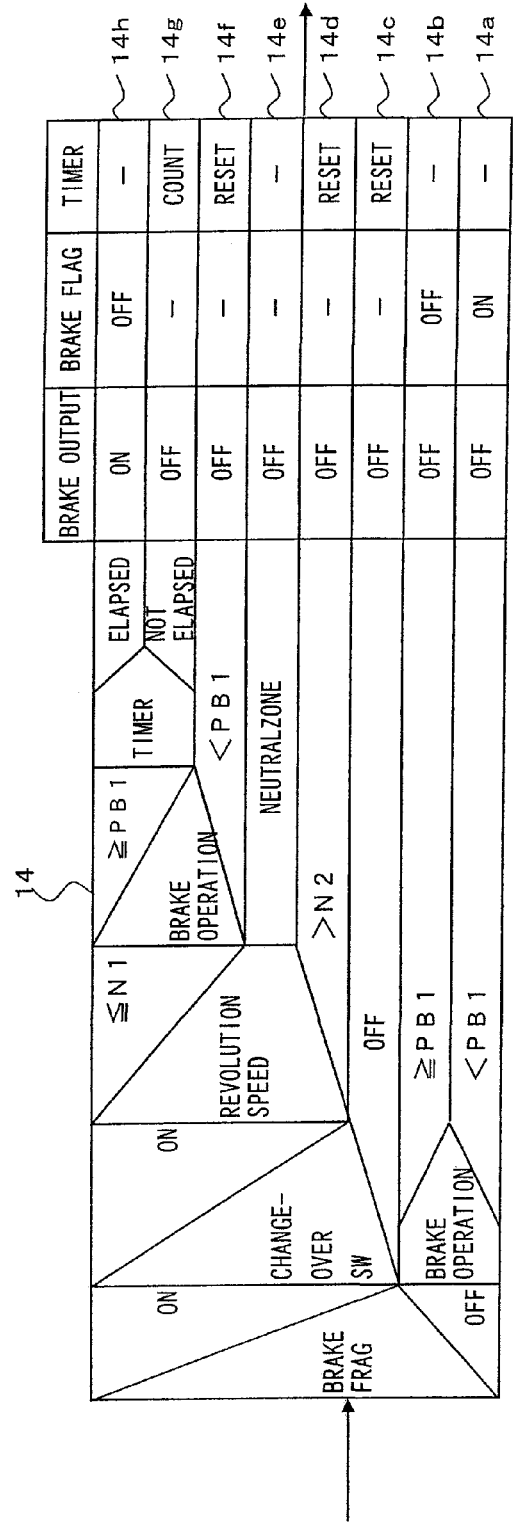
(b)

WORK VEHICLE CONTROL DEVICE

CROSS REFERENCE TO RELATED APPLICATIONS

This application is a divisional application of U.S. application Ser. No. 11/629,100, filed Dec. 11, 2006, the entire disclosure of which is expressly incorporated herein by reference and which is the U.S. national phase of PCT International Application No. PCT/JP05/010703, and claims priority under 35 U.S.C. §119 to Japanese Patent Application Nos. 2004-172209, filed Jun. 10, 2004, and 2004-184697, filed Jun. 23, 2004.

TECHNICAL FIELD

The present invention relates to a work vehicle control device that controls the operation of a hydraulic brake mounted in a wheel excavator or the like.

BACKGROUND ART

A work vehicle such as a wheel excavator normally includes a service brake mounted thereat to apply a braking force as a brake valve is driven in response to an operation of a brake pedal. This brake can be utilized as a work brake when the work vehicle is engaged in operation and, in such a case, the service brake is continuously engaged in operation by operating a brake switch. Namely, the brake is hydraulically locked. The brake device disclosed in the following priority art literature is an example of this type of brake device.
Patent reference literature 1: Japanese Laid Open Patent Publication No. H9-184169

DISCLOSURE OF THE INVENTION

Problems to be Solved by the Invention

However, the operator needs to let go of an operating lever in order to operate the brake switch when locking the brake through the brake switch operation as described above, which is not desirable as the operating procedure is inefficient.

Means for Solving the Problems

A control device for a work vehicle according to the present invention is characterized by including: a hydraulic brake device that generates a braking force corresponding to a brake pedal operation performed while the vehicle is traveling; a brake lock means for applying and releasing a hydraulic lock on the hydraulic brake device; a brake pedal operation detection means for detecting an operation of the brake pedal; and a control means for controlling the brake lock means so as to apply the hydraulic lock on the hydraulic brake device upon detecting via the brake pedal operation detection means a predetermined depressing operation of the brake pedal.

A vehicle speed detection means for detecting a vehicle speed may further be included, and the hydraulic lock may be applied on the hydraulic brake device if the predetermined depressing operation of the brake pedal is detected by the brake pedal operation detection means and the vehicle speed detection means detects that the vehicle is in a stationary state or is traveling at a speed equal to or lower than a predetermined speed.

A hydraulic cylinder that supports a wheel or an axle of the vehicle, and a cylinder lock means for applying and releasing a hydraulic lock on the hydraulic cylinder may further be provided, and the hydraulic lock may be applied on the hydraulic cylinder as the hydraulic brake device becomes hydraulically locked.

Moreover, the hydraulic lock may be applied on the hydraulic cylinder when lock engage conditions under which non-operation at the traveling pedal is detected by the traveling pedal operation detection means and the vehicle speed detection means detects that the vehicle is in a stationary state or is traveling at a speed equal to or lower than a predetermined speed are achieved.

The hydraulic lock may be applied on the hydraulic cylinder if a state, in which non-operation at the traveling pedal is detected by the traveling pedal operation detection means and the vehicle speed detection means detects that the vehicle is in a stationary state or is traveling at a speed equal to or lower than the predetermined speed, is sustained over a predetermined length of time.

The hydraulic lock having been applied to the hydraulic brake device may be released if an operation other than the predetermined depressing operation is detected and then the predetermined depressing operation is detected by the brake pedal operation detection means.

A mode change-over means for switching between an auto lock mode in which the hydraulic brake device is locked by the control means and a manual lock mode in which the hydraulic brake device is locked without using the control means may be provided.

A selection member used to select one of a brake engaged state and a brake released state for a work brake device and a parking brake device may be provided, and when the brake released state is selected for the work brake device and the parking brake device with the selection member, the hydraulic lock may be applied on the hydraulic brake device upon detecting via the brake pedal operation detection means the predetermined depressing operation of the brake pedal, and such that as a brake state other than the brake released state is subsequently selected for the work brake device and the parking brake device and then, the brake released state is selected for the work brake device and the parking brake device via the selection member, the hydraulic lock on the hydraulic brake device may be released.

It is also possible that when the brake released state is selected for the work brake device and the parking brake device with the selection member, the hydraulic brake device is hydraulically locked upon detecting via the brake pedal operation detection means the predetermined depressing operation of the brake pedal so that as a brake state other than the brake released state is subsequently selected for the work brake device and the parking brake device and then the brake released state is selected for the work brake device and the parking brake device via the selection member, the hydraulic lock on the hydraulic brake device is released, and that once the hydraulic lock is applied to the hydraulic cylinder following the hydraulic lock on the hydraulic brake device, the hydraulic lock on the hydraulic cylinder is not released unless the hydraulic lock on the hydraulic brake device is first released.

Furthermore, a control device for a work vehicle according to the present invention is characterized by including: a hydraulic brake device that generates a braking force corresponding to a brake pedal operation performed while the vehicle is traveling; a brake lock means for applying and releasing a hydraulic lock on the hydraulic brake device; a hydraulic cylinder that supports a wheel or an axle of the vehicle; a cylinder lock means for applying a hydraulic lock on the hydraulic cylinder and releasing the hydraulic lock; a brake pedal operation detection means for detecting an operation of the brake pedal; and a control means for controlling the brake lock means and the cylinder lock means such that the hydraulic brake device is hydraulically locked upon detecting via the brake pedal operation detection means a predetermined depressing operation of the brake pedal and such that the hydraulic lock subsequently applied on the hydraulic cylinder is not released unless the hydraulic lock on the hydraulic brake device is first released.

A work detection means for detecting whether or not the vehicle is engaged in work may further be provided, and it is possible to control the cylinder lock means such that the hydraulic lock having been applied on the hydraulic cylinder under the lock engage conditions is subsequently released if the lock engage conditions are no longer satisfied and the work detection means detects that the vehicle is not engaged in work.

It is also possible to include a cylinder pressure detection means for detecting a pressure at each of a pair of hydraulic cylinders, one disposed on a left and another disposed on a right; and to control the cylinder lock means such that the hydraulic lock having been applied on the hydraulic cylinders under the lock engage conditions is subsequently released if the lock engage conditions are no longer satisfied and a pressure difference between the pressures at the hydraulic cylinders detected by the cylinder pressure detection means is equal to or less than a predetermined value.

It is preferable to include a manual lock control means for manually controlling the cylinder lock means by invalidating control executed by the control means, and it is preferable that, as a lock engage command is issued by the manual lock control means, the hydraulic cylinders are locked regardless of whether or not the lock engage conditions are achieved, and in response to a lock release command issued by the manual lock control means, the hydraulic lock on the hydraulic cylinders is released at least if the pressure difference between the pressures at the hydraulic cylinders is equal to or less than the predetermined value.

The hydraulic cylinder may be a ram cylinder with its oil chamber connected to a tank or may be a suspension cylinder with its oil chamber connected to an accumulator.

Effect of the Invention

According to the present invention, the hydraulic brake device is hydraulically locked upon detecting a predetermined depressing operation at the brake pedal, which eliminates the need to perform additional tasks such as switching the brake switch. Thus, the brake can be locked with ease without having to let go of the operating lever.

BRIEF DESCRIPTION OF THE DRAWINGS

FIG. 3 is a block diagram showing in detail the essential part of FIG. 2;

Figure 1:
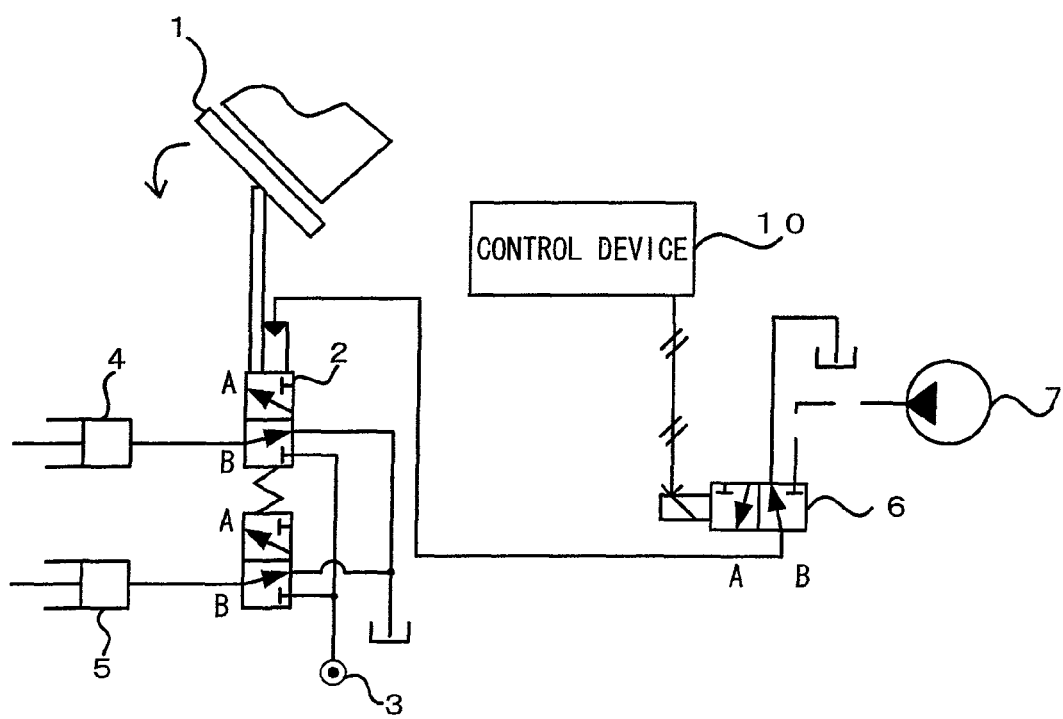
FIG. 1 is a hydraulic circuit diagram showing the structure adopted in a work vehicle control device achieved in a first embodiment of the present invention.

EXPLANATION OF REFERENCE NUMERALS 1 brake pedal
2 brake valve
4,5 brake cylinder
6 solenoid controlled directional control valve
10 control device
21 revolution speed sensor
22 pressure sensor
23 proximity switch
24 change-over switch
25 brake switch
33 ram cylinder
34 pilot check valve
35 solenoid controlled directional control valve
37 suspension cylinder
40 control device
51 pressure sensor
61 vehicle speed detector
62 pedal operation detector
63 work operation detector
64 change-over switch
65, 66 pressure sensor
100 control device

BEST MODE FOR CARRYING OUT THE INVENTION

First Embodiment

Figure 2:
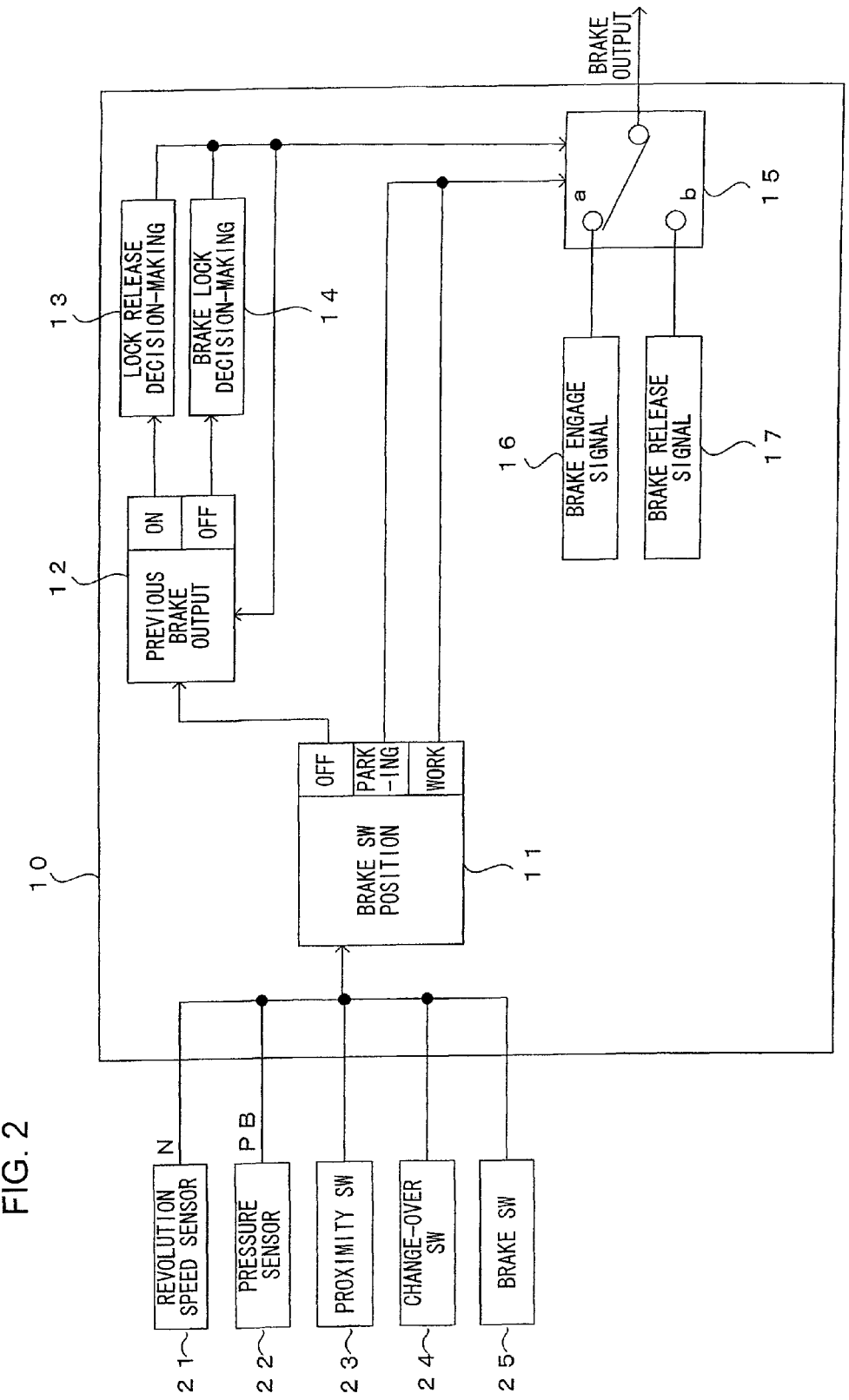
FIG. 2 is a block diagram of the structure adopted in the control device in FIG. 1.

The following is an explanation of the first embodiment of a work vehicle control device according to the present invention, given in reference to FIGS. 1 through 3.

The control device achieved in the first embodiment controls a hydraulic brake. FIG. 1 is a hydraulic circuit diagram showing the overall structure of the control device achieved in the first embodiment. A hydraulic brake mounted in a work vehicle that travels on regular roads on tires, such as a wheel excavator, is a service brake that generates a braking force corresponding to the extent to which a brake pedal 1 is operated while the work vehicle travels. A brake valve 2 in FIG. 1 is switched in response to an operation at the brake pedal 1 and pressure oil from a hydraulic source 3 is guided to brake cylinders 4 and 5 via the brake valve 2. The pressure oil thus guided to the brake cylinders 4 and 5 causes the brake cylinders to stroke. As a result, brake disks (not shown) are driven, thereby applying a braking force that will cause the vehicle to stop or decelerate. It is to be noted that the brake cylinders 4 and 5 are respectively engaged in operation in conjunction with the front wheels and the rear wheels.

A pilot port at the brake valve 2 is connected via a solenoid controlled directional control valve 6 to either a pilot hydraulic source (hydraulic pump 7) or a tank. The solenoid controlled directional control valve 6 is switched to position A and to position B respectively in response to a brake engage signal and a brake release signal to be detailed later, which are provided by a control device 10.

As the solenoid controlled directional control valve 6 is switched to position A, a pilot pressure from the hydraulic pump 7 is applied to the pilot port at the brake valve 2. In response, the brake valve 2 is switched to position A and as the pressure oil from the hydraulic source 3 is applied to both the brake cylinders 4 and 5, the service brake becomes hydraulically locked. It is to be noted that when the service brake is hydraulically locked, the hydraulic brake is continuously engaged in operation by applying the pressure oil from the hydraulic source 3 to the cylinders 4 and 5, irrespective of the operation at the brake pedal 1. In the hydraulically locked state, there is no need to operate the brake pedal 1 and the hydraulically locked brake functions as a work brake. When the solenoid controlled directional control valve 6 is switched to position B on the other hand, the tank pressure is applied to the pilot port at the brake valve 2. As a result, the brake valve 2 is switched to position B and the tank pressure is applied to both brake cylinders 4 and 5, thereby releasing the work brake (the hydraulic locked is released).

FIG. 2 is a block diagram showing the structure adopted in the control device 10. The control device 10 is connected with a revolution speed sensor 21 which detects a revolution speed N of a transmission, having a correlation to the vehicle speed, a pressure sensor 22 which detects the pressure applied to the brake cylinders 4 and 5, i.e., an operation pressure PB at the brake pedal 1, a proximity switch 23 which is installed under the brake pedal 1 to detect a depression of the brake pedal 1 to a predetermined extent or more, a change-over switch 24 with which either an automatic brake lock or a manual brake lock is selected and a brake switch 25 with which a parking brake and the work brake are engaged/released.

The proximity switch 23 enters an on state when the brake pedal 1 is depressed to the maximum extent and enters an off state when the brake pedal 1 is no longer depressed to the maximum extent. The change-over switch 24 enters an on state as it is switched to the auto position and enters an off state as it is switched to the manual position. The brake switch 25 can be switched to an off position, a parking position or a work position. When the brake switch 25 is switched to the off position, the work brake (see FIG. 1) and the parking brake (not shown) are both released, when it is switched to the parking position, the parking brake is engaged, and when it is switched to the work position, the work brake is engaged.

Signals from the sensors 21 and 22 and the switches 23-25 are input to an input circuit 11 of the control device 10. The input circuit 11 judges the position at which the brake switch 25 is currently set. When the brake switch 25 is at the off position, a decision is made in a previous brake output decision-making circuit 12 as to whether the immediately preceding brake output was on or off. This decision is made based upon signals provided from a lock release decision-making circuit 13 and a brake lock decision-making circuit 14. If it is decided that the immediately preceding brake output was off, brake lock decision-making processing to be detailed later is executed in the brake lock decision-making circuit 14, whereas if it is decided that the immediately preceding brake output was on, lock release decision-making processing to be detailed later is executed in the lock release decision-making circuit 13.

A switching circuit 15 switches a switch therein to position (a) or position (b) in response to signals provided from the brake switch 25 and the decision-making circuits 13 and 14. Namely, the switch at the switching circuit 15 is switched to position (a) if on signals are output from the decision-making circuits 13 and 14 while the brake switch 25 is at the off position, whereas the switch is switched to position (b) if off signals are output from the decision-making circuits 13 and 14 while the brake switch 25 is at the off position. As the brake switch 25 is switched to the parking position, the switch at the switching circuit 15 is switched to position (b) regardless of the statuses of the signals from the decision-making circuits 13 and 14, and as the brake switch is switched to the work position, the switch is switched to position (a) regardless of the statuses of the signals from the decision-making circuits 13 and 14. Upon switching the switch at the switching circuit 15 to position (a), a brake engage signal is output from an output circuit 16, whereas upon switching the switch to position (b) a brake release signal is output from an output circuit 17.

FIG. 3(*a*) is a block diagram showing in detail the processing executed in the lock release decision-making circuit 13 and FIG. 3(*b*) is a block diagram showing in detail the processing executed in the brake lock decision-making circuit 14. As shown in FIG. 3(*b*), the brake lock decision-making circuit 14 outputs a brake on signal or a brake off signal based upon the on/off state of a brake flag, the on/off state of the change-over switch 24, the revolution speed N of the transmission, the operation pressure PB at the brake pedal 1 and the length of time counted at a timer. Namely, when the brake flag is off and the operation pressure PB is less than a predetermined value PB1, it outputs the brake off signal and turns on the brake flag (14*a*). The predetermined value PB1 is equivalent to the operation pressure at the brake pedal 1 when it is depressed to the maximum extent. If the brake flag is off and the brake operation pressure PB is equal to or greater than the predetermined value PB1, the brake lock decision-making circuit outputs a brake off signal and leaves the brake flag off (14*b*). The brake flag, which is to be described in detail later, is provided to prevent the brake from unintentionally reentering a released state or a locked state when the brake pedal 1, initially operated to set the brake in the hydraulically locked state or the released state, is continuously operated.

When the brake flag is on and the change-over switch 24 is at the off (manual) position, or when the change-over switch 24 is at the on (auto) position and the revolution speed N is greater than a predetermined value N2, the brake lock decision-making circuit 14 outputs a brake off signal and resets the timer (14*c*, 14*d*). When the brake flag is on and the change-over switch 24 is at the on position, the brake lock decision-making circuit outputs a brake off signal (14*e*) if the revolution speed N is greater than a predetermined value N1 and equal to or less than the predetermined value N2. It is to be noted that the predetermined value N1 represents the vehicle speed of the vehicle traveling slowly (e.g., approximately 5 kph) and that the predetermined value N2 represents a vehicle speed higher than that of the slowly traveling vehicle (e.g., approximately 10 kph). When the brake flag is on, the change-over switch 24 is at the on position, the revolution speed N is equal to or less than the predetermined value N1 and the brake operation pressure PB is less than the predetermined value PB1, the brake lock decision-making circuit outputs a brake off signal and resets the timer (14*f*). When the brake flag is on, the change-over switch 24 is at the on position, the revolution speed N is equal to or less than the predetermined value N1 and the brake operation pressure PB is equal to or greater than the predetermined value PB1, the brake lock decision-making circuit outputs a brake off signal and starts up the timer (14*g*). Subsequently, if these conditions are sustained over a predetermined length of time, the brake lock decision-making circuit outputs a brake on signal and turns off the brake flag (14*h*).

As shown in FIG. 3(*a*), the lock release decision-making circuit 13 outputs a brake on signal or a brake off signal based upon the on/off state of the brake flag, the on/off state of the change-over switch 24, the on/off state of the proximity switch 23 and the length of time counted by the timer. Namely, when the brake flag is off and the proximity switch 23 is in the off state, the lock release decision-making circuit outputs a brake on signal and turns on the brake flag (13*a*). When the brake flag is off and the proximity switch 23 is in the on state, the lock release decision-making circuit outputs a brake on signal and leaves the brake flag off (13*b*).

When the brake flag is on and the change-over switch 24 is at the off position, the lock release decision-making circuit outputs a brake off signal and turns off the brake flag (13*c*). When the brake flag is on, the change-over switch 24 is at the on position and the proximity switch 23 is in the off state, it outputs a brake on signal and resets the timer (13*d*). When the brake flag is on, the change-over switch 24 is at the on position and the proximity switch 23 is in the on state, it outputs a brake on signal and starts up the timer (13*e*). If these conditions are sustained over a predetermined length of time, it outputs a brake off signal and turns off the brake flag (13*f*).

Next, the primary operation executed in the control device in the first embodiment is explained.

First, the operation executed in the initial state in which the brake is not hydraulically locked (brake is released) (e.g., before the engine is started (non-running state) by turning on the ignition switch, with the brake flag in an off state) is explained. From this state, the brake becomes hydraulically locked in accordance with the processing shown in FIG. 3(*b*). In the initial state, the brake flag is off and the brake operation pressure PB is less than the predetermined value PB1 unless the brake pedal 1 is operated. Accordingly, a brake off signal is output and the brake flag is turned on (14*a*). Even if the brake pedal 1 is operated in the initial state, the brake operation pressure PB is not generated since the engine is not running and thus, the brake is controlled as shown in (14*a*). It is to be noted that the conditions (14*b*), to be detailed later, are set so as to prevent unintentional re-engagement of the hydraulic lock when the brake pedal 1 is continuously operated after releasing the hydraulic lock on the brake at engine start-up.

As the engine is driven and the vehicle thus exits the initial state to shift into regular traveling operation, the change-over switch 24 is switched to the manual position and the brake switch 25 is switched to the off position. In response, the brake lock decision-making circuit 14 outputs the brake off signal and resets the timer (14*c*). As a result, the switch at the switching circuit 15 is switched to position (a), a brake release signal is output from the output circuit 17 in the control device 10, and the solenoid controlled directional control valve 6 is switched to position B. Thus, no pilot pressure is applied to the brake valve 2 and the brake lock (work brake) is released. Under these circumstances, the brake valve 2 is switched toward position A in correspondence to the extent to which the brake pedal 1 is operated and thus, the service brake is engaged. As described above, when the work brake is not automatically controlled, such as when the work vehicle is engaged in a regular traveling operation, the brake lock decision-making circuit 14 assumes the conditions (14*c*).

The parking brake is applied by switching the brake switch 25 to the parking position. This forcibly switches the switch at the switching circuit 15 to position (b) and a brake release signal is output from the output circuit 17 in the control device 10. As a result, the work brake is released and the parking brake is engaged. When manually operating the work brake the brake switch 25 should be switched to the work position so as to forcibly switch the switch at the switching circuit 15 to position (a). A brake engage signal will then be output from the output circuit 16 in the control device 10, thereby engaging the work brake and releasing the parking brake.

When automatically controlling the work brake, the change-over switch 24 is switched to the auto position. At this point in time, the brake flag is on, as indicated in (14*a*), and as the change-over switch 24 enters an on state, a specific set of conditions among 14*d*-14*h* is achieved in correspondence to the revolution speed N and the operating state (PB) at the brake pedal 1. Under these circumstances, unless the brake pedal 1 is depressed to the maximum extent, a set of conditions among 14*d*~14*f* is achieved depending upon the revolution speed N and a brake off signal is invariably output. As a result, the solenoid controlled directional control valve 6 is switched to position B and the brake valve 2 is switched to position B, thereby releasing the work brake. If the brake pedal 1 is depressed to the maximum extent when the revolution speed N is equal to or less than N1, the timer is started up (14*g*). If the brake pedal remains depressed to the maximum extent over a predetermined length of time, a brake on signal is output and the brake flag is turned off (14*h*). As a result, the solenoid controlled directional control valve 6 is switched to position A and the brake valve 2 is switched to position A, thereby engaging the work brake. Thus, the need to operate the brake switch 25 when ending the traveling operation and starting the actual work is eliminated for improved operational efficiency.

It is to be noted that if the operation at the brake pedal 1 stops while the timer count is in progress, the timer is reset (14*f*). The timer is started up subsequently as the brake pedal 1 is depressed to the maximum extent. In addition, the timer count stops (14*e*) once the revolution speed N exceeds the predetermined value N1, and the timer is reset (14*d*) when the revolution speed N becomes equal to or greater than the predetermined value N2. The timer is also reset when the change-over switch 24 is turned off (14*c*). If the brake switch 25 is set to a position other than the off position and is then reset to the off position, the brake lock control itself is reset.

As the brake becomes locked (14*h*) through the processing executed in the brake lock decision-making circuit 14, a brake lock sustain signal (brake on signal) or a lock release signal (brake off signal) is output (13*a*-13*f*) from the lock release decision-making circuit 13, which makes a decision as to whether or not the brake is to be released from the locked state. Since the brake flag is in an off state when the brake is locked (14*h*) by the brake lock decision-making circuit 14, the processing in the lock release decision-making circuit 13 starts with the brake flag in the off state.

In this situation, the proximity switch 23 is set in an off state if a brake lock release operation has not been performed, i.e., if the brake pedal 1 has not been depressed to the maximum extent. Thus, a brake on signal is output to sustain the brake in the locked state and the brake flag is turned on (13*a*). As the brake pedal 1 is depressed to the maximum extent under these conditions in order to release the brake lock, the proximity switch 23 enters an on state. If the change-over switch 24 is currently at the on position, the timer is started up (13e), a brake off signal is output after the timer counts the predetermined length of time and then the brake flag is turned off (13f). In response, the solenoid controlled directional control valve 6 is switched to position B, thereby releasing the brake lock. This eliminates the need to operate the brake switch 25 when the work ends and the vehicle starts a traveling operation, which improves the operational efficiency. In addition, a brake off signal is output and the brake flag is turned off (13c) when the change-over switch 24 is turned off.

It is to be noted that if the operation at the brake pedal 1 stops while the timer count is in progress, the proximity switch 23 enters an off state and the timer is reset (13d). Subsequently, when the brake pedal 1 is depressed to the maximum extent, the proximity switch 23 becomes turned on and the timer is started up. If the brake switch 25 is set to a position other than the off position and is then reset to the off position, the brake lock control itself is reset.

After the brake becomes locked (14h, brake flag off) in response to an operation at the brake pedal 1 through the processing executed in the brake lock decision-making circuit 14, the lock release decision-making circuit 13 detects the brake flag to be in an off state and the proximity switch 23 to be in an on state if the depression of the brake pedal 1 is sustained. Under these conditions, a brake on signal is output so as to sustain the brake lock state, and it is ensured by sustaining the brake flag in the off state (13b) that the brake lock is not released. As the operation at the brake pedal 1 stops in this state, the lock release decision-making circuit 13, detecting the brake flag to be in an off state and the proximity switch 23 to be in an off state again outputs a brake on signal thereby turning on the brake flag (13a). Then the release decision-making is executed as explained earlier while the brake locked state is sustained.

In addition, if the lock is released in response to an operation at the brake pedal 1 through the processing executed in the lock release decision-making circuit 13 (13f, brake flag off) and the brake pedal then remains depressed, the brake lock decision-making circuit 14 detects the brake flag to be in an off state and the brake operation pressure PB to be equal to or greater than the predetermined value PB1. As a result, a brake off signal is output so as to sustain the brake lock release state and the brake flag is sustained in an off state (14b) so as to ensure that the brake remains unlocked. As the operation of the brake pedal 1 stops in this state, the lock decision-making circuit 14, detecting the brake flag to be in an off state and the brake operation pressure PB to be less than the predetermined value PB1, again outputs a brake off signal, thereby turning on the brake flag (14a). In this state, the lock decision-making is executed as described above while the lock release state is sustained.

The following operational effects can be achieved in the first embodiment described above.

(1) The depression of the brake pedal 1 to the maximum extent is detected via the pressure sensor 22 and the proximity switch 23. When the depression of the brake pedal 1 to the maximum extent is detected, the hydraulic brake is automatically locked or the brake lock is automatically released. Namely, when conditions under which the brake switch 25 is at the off position, the change-over switch 24 is at the on position, the revolution speed N is equal to or less than the predetermined value N1 and the brake pedal 1 is depressed to the maximum extent (brake lock engage conditions) are sustained over a predetermined length of time, the brake is locked. In addition, after the pedal has not been operated and the brake has remained in a locked state, the brake lock is released if conditions under which the brake switch 25 is at the off position, the change-over switch 24 is at the on position and the brake panel 1 is depressed to the maximum extent (brake lock release conditions) are sustained over a predetermined length of time. Since this allows the work brake to be engaged and released simply through a pedal operation without having to let go of the operating lever, the need to perform a complicated operating procedure is eliminated.

(2) The lock engage conditions include that the revolution speed N be equal to or less than the predetermined value N1, i.e., the vehicle speed be equal to or less than the predetermined value (5 kph) and thus, the brake does not become locked unless the vehicle is traveling at low speed, which, in turn, makes it possible to prevent the vehicle from coming to an abrupt stop.

(3) The work brake is engaged or released when the lock engage conditions are sustained over the predetermined length of time or the lock release conditions are sustained over the predetermined length of time. In other words, since the brake is not locked or released if such conditions are momentarily detected, the work brake is never engaged in an undesirable situation.

(4) While the brake is locked, the depression of the brake pedal 1 to the maximum extent is detected via the proximity switch 23 instead of the pressure sensor. Thus, even when the pressure applied to the brake cylinders 4 and 5 is at the maximum level and the value detected by the pressure sensor 22 remains unchanged, the depression of the brake pedal to the maximum extent can be detected.

(5) While the brake lock is in a released state, the depression of the brake pedal 1 to the maximum extent is detected via the pressure sensor 22, and thus, the pedal operation extent representing a lock engage condition and the pedal operation extent representing a lock release condition can be set to values different from each other. For instance, the pedal operation extent representing the lock engage condition can be set to a value greater than that selected for the pedal operation extent representing the lock release condition.

(6) The brake is automatically locked (auto lock mode) as the change-over switch 24 is switched to the auto position, whereas the auto lock on the brake is released (manual lock mode) as the change-over switch is switched to the manual position. Thus, the operator is allowed to manually lock and release the brake as he pleases.

(7) The automatic control for the brake lock is reset in response to an operation at the brake switch 25, and thus, a special dedicated reset switch does not need to be provided.

Second Embodiment

Figure 4:
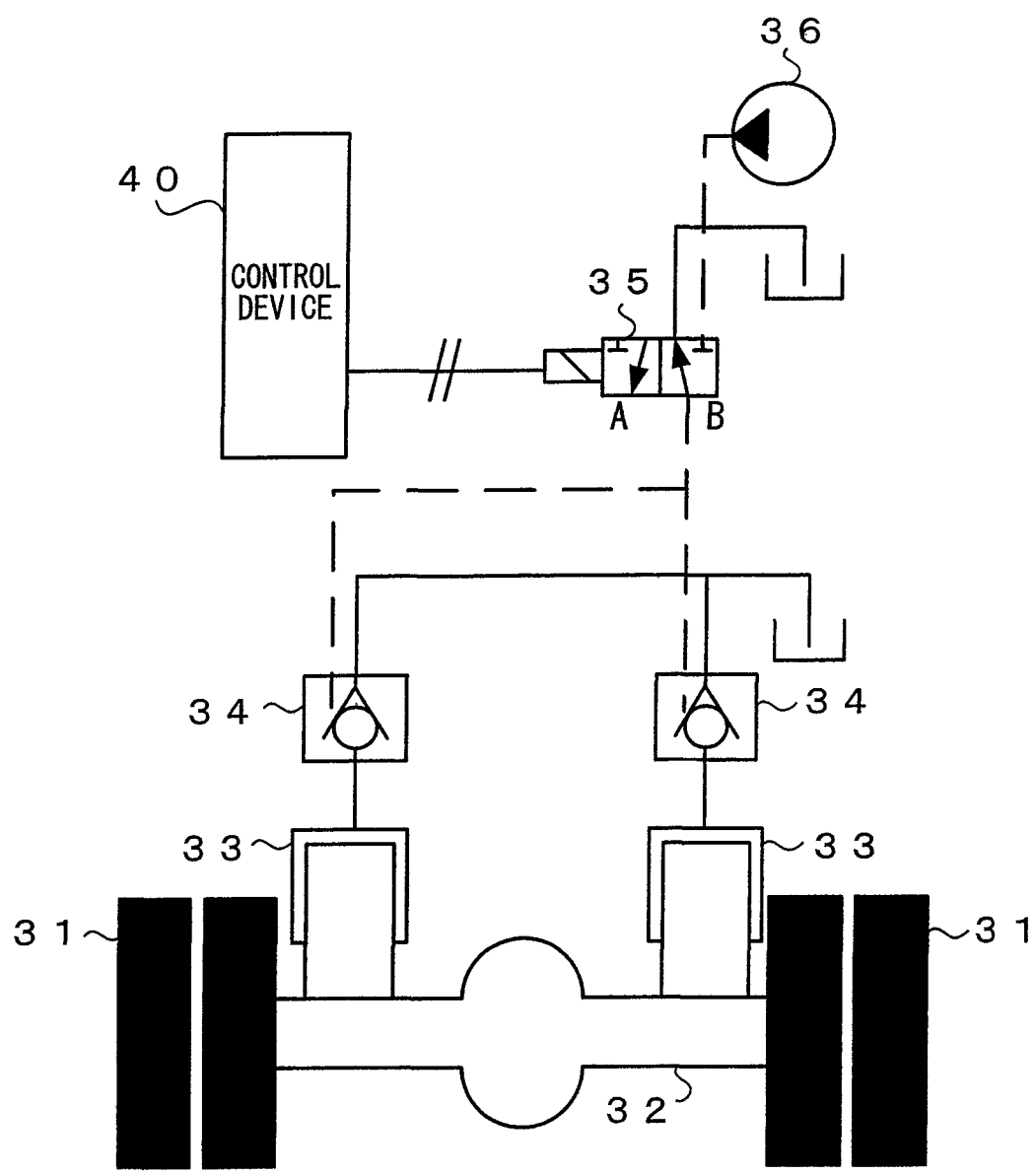
FIG. 4 is a hydraulic circuit diagram showing the structure adopted in the work vehicle control device achieved in a second embodiment of the present invention.
Figure 5:
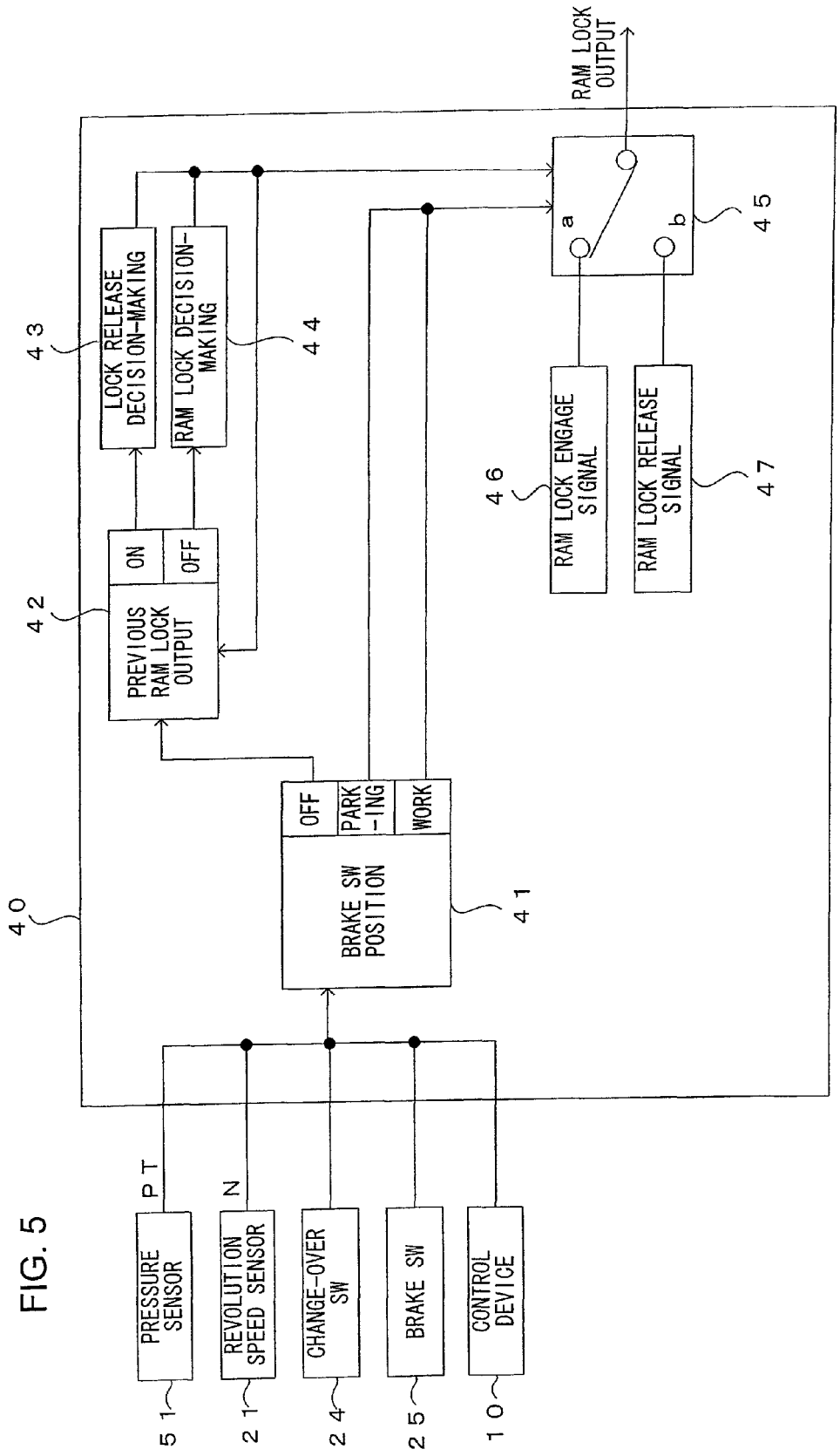
FIG. 5 is a block diagram of the structure adopted in the control device in FIG. 4.
Figure 6:
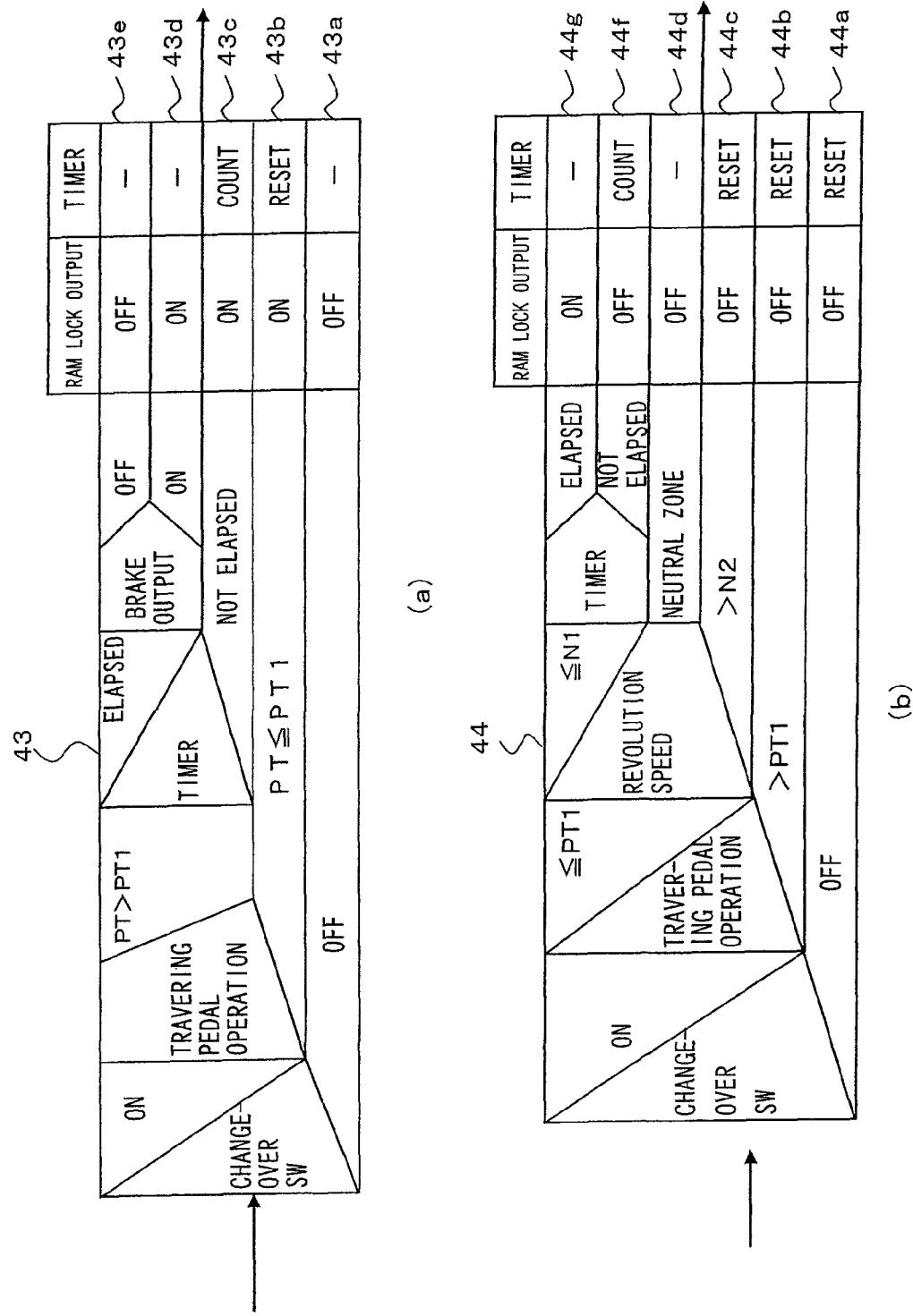
FIG. 6 is a block diagram showing in detail the essential part of FIG. 5.

In reference to FIGS. 4-6, the second embodiment of the work vehicle control device according to the present invention is explained. In the second embodiment, ram cylinders are controlled as well as the brake lock, as in the first embodiment. FIG. 4 is a hydraulic circuit diagram showing the overall structure of the ram cylinder control device achieved in the second embodiment. This control device is installed in a work vehicle such as a wheel excavator, together with the brake device in FIG. 1.

As shown in FIG. 4, a pair of extendable ram cylinders 33 are mounted, one on the left side and the other on the right side, between an axle 32 at which tires 31 are mounted on the left side and the right side of the vehicle and a body frame (not shown). The ram cylinders 33 are linked via pins or the like to the body frame on their cylinder tube side, whereas their ends on the cylinder rod side are set in contact with the axle 32 instead of being connected via pins or the like. By locking the ram cylinders 33 as described later, the axle 32 is supported without allowing any rocking thereof. The ram cylinders 33 are each connected to a tank via a pilot check valve 34. A pilot port at each pilot check valve 34 is connected via a solenoid controlled directional control valve 35 to a pilot hydraulic source (hydraulic pump 36) or the tank. The solenoid controlled directional control valve 35 is switched to position A and to position B respectively in response to a lock release signal and a lock engage signal, both provided by a control device 40.

As the solenoid controlled directional control valve 35 is switched to position A, a pilot pressure from the hydraulic pump 36 is applied to the pilot port at each pilot check valve 34. This allows the pilot check valve 34 to function as a release valve and the ram cylinder 33 is allowed to extend/contract (lock released). When the ram cylinder 33 is in the lock released state, the cylinder 33 is in communication with the tank and extends/contracts as the axle 32 rocks. As the solenoid controlled directional control valve 35 is switched to position B, the tank pressure is applied to the pilot port at each pilot check valve 34. This allows the pilot check valve 34 to function as a check valve and extension/contraction of the ram cylinder 33 is disallowed (lock engaged). When the ram cylinder 33 is in the lock engaged state, communication between the cylinder 33 and the tank is cut off, the extension/contraction of the cylinder 33 is disallowed and the axle 32 is not allowed to rock. As a result, an excavating operation or the like can be performed in a stable manner by preventing the vehicle from rocking.

FIG. 5 is a block diagram showing the structure adopted in the control device 40. It is to be noted that the same reference numerals are assigned to components identical to those in FIG. 2. The control device 40 is connected with a pressure sensor 51 which detects a pressure PT corresponding to the extent to which a traveling pedal (accelerator pedal) is operated, a revolution speed sensor 21, a change-over switch 24, a brake switch 25 and a control device 10. Signals from the sensors 51 and 21 and the switches 24 and 25 and a brake signal (a brake engage signal or a brake release signal) from the control device 10 are individually input to an input circuit 41 in the control device 40.

The input circuit 41 makes a decision with regard to the position to which the brake switch 25 is switched. As the brake switch 25 is switched to the off position, a decision is made in a previous ram lock output decision-making circuit 42 as to whether the immediately preceding ram lock output was on or off. This decision is made based upon signals provided by a lock release decision-making circuit 43 and a ram lock decision-making circuit 44. If it is decided that the immediately preceding ram lock output was off, ram lock decision-making processing to be detailed later is executed in the ram lock decision-making circuit 44, whereas if it is decided that the immediately preceding ram lock output was off, lock release decision-making processing to be detailed later is executed in the lock release decision-making circuit 43.

A switching circuit 45 switches a switch therein to position (a) or position (b) in response to signals provided from the brake switch 25 and the decision-making circuits 43 and 44. Namely, the switch at the switching circuit 45 is switched to position (a) if on signals are output from the decision-making circuits 43 and 44 while the brake switch 25 is at the off position, and the switch is switched to position (b) if off signals are output from the decision-making circuits 43 and 44 while the brake switch 25 is at the off position. As the brake switch 25 is switched to the parking position or the work position, the switch at the switching circuit 45 is switched to position (a) regardless of the statuses of the signals from the decision-making circuits 43 and 44. Upon switching the switch at the switching circuit 45 to position (a), a ram lock engage signal is output from an output circuit 46, whereas as the switch is switched to position (b) a ram lock release signal is output from an output circuit 47.

FIG. 6(a) is a block diagram showing in detail the processing executed in the lock release decision-making circuit 43, whereas FIG. 6(b) is a block diagram showing in detail the processing executed in the ram lock decision-making circuit 44. As shown in FIG. 6(b), the ram lock decision-making circuit 44 outputs a ram lock on signal or a ram block off signal based upon the on/off state of the change-over switch 24, the operation pressure PT at the traveling pedal, the revolution speed N of the transmission and the length of time counted on a timer. Namely, it outputs a ram lock off signal and resets the timer (44a) when the change-over switch 24 is set at the off (manual) position. It outputs a ram lock off signal and resets the timer (44b) when the change-over switch 24 is at the on (auto) position and the operation pressure PT at the traveling pedal is greater than a predetermined value PT1. A value that can be used to judge whether or not the traveling pedal is operated should be selected as the predetermined value PT1.

When the change-over switch 24 is at the on position and the operation pressure PT at the traveling pedal is equal to or less than the predetermined value PT1 (the traveling pedal is not operated), the ram lock decision-making circuit 44 outputs a ram lock off signal and resets the timer (44c), if the revolution speed N is greater than a predetermined value N2. When the change-over switch 24 is at the on position and the operation pressure PT at the traveling pedal is equal to or less than the predetermined value PT1, the ram lock decision-making circuit outputs a ram lock off signal (44d) if the revolution speed N is greater than a predetermined value N1 and equal to or less than the predetermined value N2. When the change-over switch 24 is at the on position and the operation pressure PT at the traveling pedal is equal to or less than the predetermined value PT1, the ram lock decision-making circuit outputs a ram lock off signal and starts up the timer (44f) if the revolution speed N is equal to or less than the predetermined value N1 (if the vehicle is in a stationary state or traveling at low speed). Subsequently, if these conditions are sustained over a predetermined length of time, the ram lock decision-making circuit outputs a ram lock on signal (44g). It is to be noted that the predetermined length of time is set equal to, for instance, the predetermined length of time (14h in FIG. 3) set for the brake engagement control.

As shown in FIG. 6(a), the lock release decision-making circuit 43 outputs a ram lock on signal or a ram lock off signal based upon the on/off state of the brake output, the on/off state of the change-over switch 24, the operation pressure PT at the traveling pedal and the length of time counted on the timer. Namely, it outputs a ram lock off signal (43a) when the change-over switch 24 is at the off position. When the change-over switch 24 is at the on position, it outputs a ram lock on signal and resets the timer (43b) if the operation pressure PT at the traveling pedal is equal to or less than the predetermined value PT1.

When the change-over switch 24 is at the on position and the operation pressure PT at the traveling pedal is greater than the predetermined value PT1, the lock release decision-making circuit 43 outputs a ram lock on signal and starts up the timer (43c). If a brake on signal (brake engage signal) is currently output when a predetermined length of time is counted by the timer, the lock release decision-making circuit outputs a ram lock on signal (43d), whereas if a brake off signal (brake release signal) is currently output when the predetermined length of time is counted by the timer, the lock release decision-making circuit outputs a ram lock off signal (43e). It is to be noted that the predetermined length of time is set equal to, for instance, the predetermined length of time (13f in FIG. 3) set for the brake release control.

Next, the primary operation executed in the control device in the second embodiment is explained.

The change-over switch 24 is set at the manual position and the brake switch 25 is set at the off position while the vehicle engages in a regular traveling operation. At these settings, the work brake is released and the service brake is engaged to an extent corresponding to the extent to which the brake pedal 1 is operated, as in the first embodiment. Under these conditions, the ram lock decision-making circuit 44 outputs a ram lock off signal and resets the timer (44a). Then, a ram lock release signal is output from the output circuit 47 in the control device 40, switching the solenoid controlled directional control valve 35 to position A. As a result, the pilot pressure from the hydraulic pump 36 is applied to the pilot ports at the pilot check valves 34, thereby releasing the ram lock. Thus, the ram cylinders 33, now allowed to extend/contract, extend/contract in conformance to the rocking motion of the axle 32.

As the brake switch 25 is switched to the work position while the change-over switch 24 is at the manual position, the work brake is engaged. At this time, the switch at the switching circuit 45 is switched to position (a) in response to a signal provided by the input circuit 41 and thus, the ram cylinders 33 become locked. If, on the other hand, the brake switch 25 is switched to the parking position, the parking brake is engaged, the switch in the switching circuit 45 is switched to position (a) and the ram cylinders 33 become locked. In other words, by switching the brake switch 25 to the work position or the parking position while the change-over switch 24 is at the manual position, the ram cylinders 33 can be manually locked.

The engagement of the work brake can be automatically controlled as in the first embodiment by switching the brake switch 25 to the off position and switching the change-over switch 24 to the auto position. Namely, the hydraulic brake is locked after the brake pedal 1 is depressed to the maximum extent continuously over a predetermined length of time. Under such circumstances, if the operation pressure PT at the traveling pedal is greater than the predetermined value PT1, a ram lock off signal is output and the timer is reset (44b). As a result, the solenoid controlled directional control valve 35 is switched to position A and the ram lock is automatically released.

If the operation pressure PT at the traveling pedal is equal to or less than the predetermined value PT1, the engagement of the ram lock is automatically controlled based upon the revolution speed N. namely, if the revolution speed N is greater than the predetermined value N1, a ram lock off signal is output (44c, 44d) and the ram lock is released. When the revolution speed becomes equal to or less than the predetermined value N1, the timer is started up (44f) and the ram lock decision-making circuit 44 outputs a ram lock on signal (44g) after these conditions are sustained over a predetermined length of time. As a result, the solenoid controlled directional control valve 35 is switched to position B, thereby stopping the application of the pilot pressure to the pilot check valves 34 and locking the ram cylinders 33. Thus, the need to perform complicated switch operations to lock the ram cylinders 33 is eliminated and an excavating operation or the like can be performed with greater ease.

It is to be noted that the timer is reset if the traveling pedal is operated while the timer count is in progress (44b) and that the timer is started up if the traveling pedal is not subsequently operated. In addition, the timer count stops (44d) once the revolution speed N exceeds the predetermined value N1, and the timer is reset (44c) when the revolution speed N becomes equal to or greater than the predetermined value N2. The timer is also reset when the change-over switch 24 is turned off (44a). If the brake switch 25 is set to a position other than the off position and is then reset to the off position, the ram lock control itself is reset.

After the ram cylinders 33 become locked (44g) through the processing executed in the ram lock decision-making circuit 44, the lock release decision-making circuit 43, which makes a decision as to whether or not to release the ram cylinders 33 in the locked state, outputs a lock sustain signal (ram lock on signal) or a lock release signal (ram lock off signal) (44a-43e). Immediately after the ram lock is engaged, the operation pressure PT at the traveling pedal is equal to or less than the predetermined value PT1 and thus the locked state is sustained and the timer is reset (43b).

As the traveling pedal is depressed and the operation pressure PT becomes greater than the predetermined value PT1, the timer is started up in the ram lock state (43c). After these conditions are sustained over a predetermined length of time, the lock release decision-making circuit 43 outputs a ram lock off signal (43e) if a brake off signal is currently output from the control device 10. Under these circumstances, the solenoid controlled directional control valve 35 is switched to position A and the ram lock is released. As a result, no complicated switch operation is required when releasing the ram lock. If, on the other hand, a brake on signal is currently output by the control device 10 when the predetermined length of time is counted on the timer, the ram lock on signal is continuously output so as to sustain the ram lock state (43d). In other words, unless the brake lock is released, the ram lock is not released even when the predetermined length of time is counted on the timer, which allows the work to be carried on with the vehicle maintaining a stable attitude.

It is to be noted that if the operation at the traveling pedal stops while the timer count is in progress, the timer is reset (43b). When the traveling pedal is subsequently operated, the timer is started up. When the brake switch 25 is set to a position other than the off position and is then reset to the off position, the ram lock control itself is reset. If the change-over switch 24 is turned off while the ram lock is engaged, a ram lock off signal is output and the ram lock is released (43a).

The following operational effects can be achieved in the second embodiment, in addition to operational effects similar to those of the first embodiment.

(1) If conditions under which the traveling pedal is not operated (PT≦PT1) and the revolution speed N is equal to or less than the predetermined value N1 are sustained over a predetermined length of time, the ram cylinders 33 are locked simultaneously as the brake lock is engaged. Thus, the ram cylinders 33 can be locked without having to perform any complicated switch operation, which allows the work to be started with ease.

(2) While the brake and the ram cylinders 33 are both locked, the ram lock is released if the traveling pedal is continuously operated over a predetermined length of time, and the brake lock is released. Thus, the ram lock can be released without requiring any complicated switch operation. Since the ram lock is not released unless the brake lock is first released, the ram lock is never released while the work brake is engaged. Thus, the vehicle can engage in work continuously with a stable attitude.

(3) Since the ram cylinders 33 are locked if conditions under which the traveling pedal is not operated and the revolution speed N is equal to or less than the predetermined value N1 are sustained over the predetermined length of time and the ram cylinders 33 are released after the traveling pedal is operated continuously over a predetermined length of time, the ram cylinders 33 are never locked or released in an undesirable situation.

(4) The ram lock can be manually released through an operation of the change-over switch 24 and thus, the ram lock can be immediately released whenever the operator desires.

(5) Since the ram cylinders 33 are locked or released through an operation of the brake switch 25, the brake lock and the ram lock can be engaged at once.

It is to be noted that a special switch to be operated when manually locking the ram cylinders 33 may be provided. For instance, the change-over switch 24 may be provided as a three-position switch, which can be set to one of three positions, i.e., "auto", "manual (ram lock engage)" and "manual (ram lock release)", so as to lock the ram cylinders 33 as it is switched to the manual (ram lock engage) position and release the ram cylinders 33 as it is switched to the manual (ram lock release) position. With this switch, the ram cylinders 33 can be manually locked and released.

In addition, the ram cylinders 33 may be locked simultaneously when the brake lock is engaged. In such a case, the ram lock decision-making circuit 44 should make a decision with regard to the brake output on/off, and if, for instance, the brake switch 25 is at the off position, the change-over switch 24 is in an on state and the brake output is on (brake lock), a ram lock on signal should be output. Since the brake lock and the ram lock are executed simultaneously in this case, the work can be started with a stable attitude immediately. Alternatively, a decision may be made in the brake lock decision-making circuit 14 with regard to the ram lock output on/off, and a brake on signal may be output if the brake switch 25 is at the off position, the change-over switch 24 is in an on state and the ram lock output is on (ram lock).

Pilot lamps may be connected to the control devices 10 and 40, and the pilot lamps may come on/go off in response to the brake on/off signal and the ram lock on/off signal provided by the control devices 10 and 40. In this case, the operator is able to verify the brake lock and ram lock statuses by checking the pilot lamps.

In the embodiment, the ram cylinders 33 are locked when the traveling pedal is not operated for a predetermined length of time and the ram cylinders 33 are released when the traveling pedal is continuously operated over a predetermined length of time. These lengths of time may be set freely by the operator through, for instance, dial operation, so as to customize the ram lock engagement timing and the ram lock release timing in accordance with the operator's preference. Likewise, the predetermined lengths of time to elapse after the brake lock engage conditions are achieved and the brake lock release conditions are achieved may be adjusted in correspondence to the operator's preference. It is to be noted that the predetermined lengths of time may be 0, and in such a case, no timer is required.

In the embodiment described above, the pilot pressure is supplied to the brake valve 2 and the pressure oil from the hydraulic source 3 is applied to the brake cylinders 4 and 5 by switching the solenoid controlled directional control valve 6 in response to a signal provided by the control device 10. However, the present invention is not limited to this example and as long as the hydraulic brake is hydraulically locked when a depression of the brake pedal 1 to a predetermined extent (e.g., to the maximum extent) is detected, the control means (control device 10), the hydraulic brake and the brake lock means may assume any structures. In addition, the predetermined extent of depression may be an extent other than the maximum extent.

The ram cylinders 33 disposed between the body frame and the axle 32 (see FIG. 4) are locked or released by switching the pilot check valves 34 in response to a signal provided by the control device 40. However, the present invention is not limited to this example and the control means (control device 40) and the cylinder lock means may assume any structures as long as the ram cylinders are locked in response to a hydraulic brake lock or the ram cylinders 33 are locked upon detecting that the traveling pedal has not been operated and the vehicle has stopped or is traveling at low speed. In addition, the control device 40 may adopt a structure other than that described above as long as the ram cylinders 33, locked after the hydraulic brake becomes locked in response to the depression of the brake pedal 1 to the maximum extent, remain locked until the brake lock is released.

While the ram cylinders 33 are used as hydraulic cylinders that support the wheels or the axle of the vehicle, suspension cylinders may be utilized in place of the ram cylinders 33. In such a case, the oil chambers (rod chambers and bottom chambers) of the hydraulic cylinders should be made to communicate with each other via a pipeline to which an accumulator is connected, and at which valve devices (e.g., pilot check valves) that allow/disallow oil flow from the individual oil chambers are disposed, and the suspension cylinders should be locked or released by switching the pilot check valves.

While the depression of the brake pedal 1 to the maximum extent is detected based upon the pressure PB detected with the pressure sensor 22 and the on/off state at the proximity switch 23, the brake pedal operation detection means may assume a structure other than this. In addition, while the operation of the traveling pedal is detected by detecting the pressure PT corresponding to the extent to which the traveling pedal is operated, the traveling pedal operation detection means may adopt a structure other than this. While the vehicle speed is detected by detecting the revolution speed N of the transmission, the vehicle speed detection means may adopt a structure other than this. While the automatic lock mode, in which the hydraulic brake is automatically locked, or the manual lock mode, in which the hydraulic brake is not automatically locked, is selected by switching the change-over switch 24, a mode switching means other than the change-over switch may be utilized. Furthermore, the brake switch 25 used as a selection member may adopt any structure.

—First Variation—

While the ram lock is engaged or released based upon the signal provided by the control device 10 (a brake engage signal or a brake release signal) in the second embodiment, the ram lock may instead be engaged or released without using a signal from the control device 10. Examples of structures that may be adopted to engage/release the ram lock without using the signal from the control device 10 are explained below.

Figure 7:
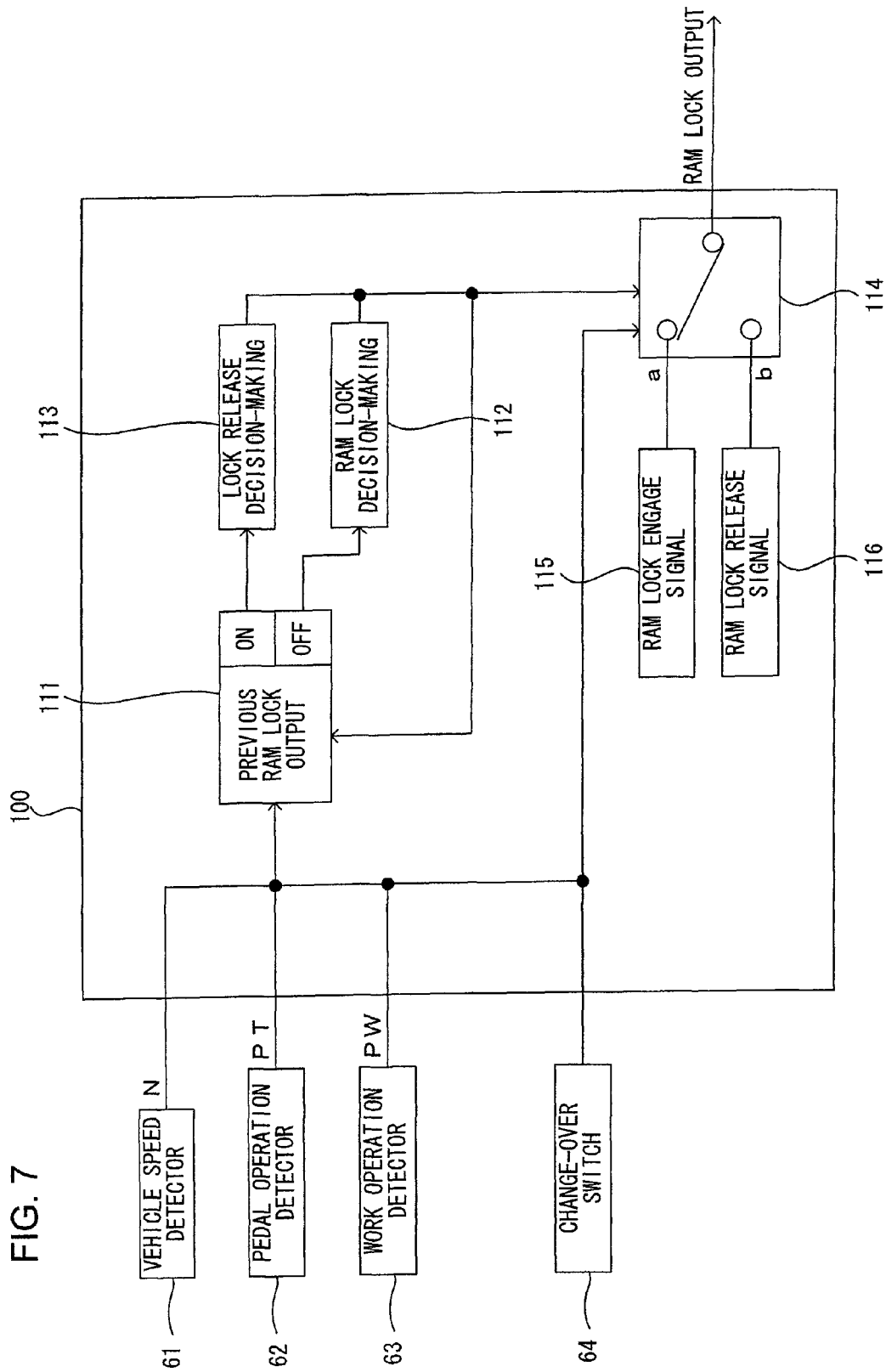
FIG. 7 is a block diagram of the structure adopted in a control device achieved as a first variation.

FIG. 7 is a block diagram showing the structure adopted in a control device 100 achieved as a first variation. It is to be noted that the hydraulic circuit in the first variation assumes a structure similar to that shown in FIG. 4, with the control device 100 utilized in place of the control device 40 in FIG. 4. The control device 100 is connected with a vehicle speed detector 61 that detects the vehicle speed, a pedal operation detector 62 that detects an operation at the traveling panel, a work operation detector 63 that detects an operation at the work operating lever and a change-over switch 64 operated to choose whether or not the ram lock is to be automatically engaged/released.

The vehicle speed detector 61 may be a revolution speed sensor (the revolution speed sensor 21 described earlier) that detects the revolution speed N of the transmission, whereas the pedal operation detector 62 may be a pressure sensor (the pressure sensor 51 described earlier) that detects the pressure PT corresponding to the extent to which the traveling pedal is operated. It is to be noted that a forward operation and a reverse operation can be performed at the traveling pedal and that the pedal operation detector 62 is capable of detecting the pressure corresponding to the extent of the forward operation and the pressure corresponding to the extent of the reverse operation. The work operating lever is an operating lever with which commands for driving work device driving hydraulic cylinders (such as a boom cylinder, an arm cylinder and a bucket cylinder) mounted at the wheel excavator are issued, whereas the work operation detector 63 is a pressure sensor that generates a pilot pressure PW corresponding to the extent to which the operating lever is operated. The change-over switch 64 can be switched to one of the following three positions; "auto", "manual (lock)" and "manual (release)".

Signals from the vehicle speed detector 61, the pedal operation detector 62, the work operation detector 63 and the change-over switch 64 are input to an input decision-making circuit 111. A signal from a ram lock decision-making circuit 112, which makes a decision as to whether or not the ram lock should be engaged based upon the signals from the vehicle speed detector 61 and the pedal operation detector 62 and a signal from a lock release decision-making circuit 113, which makes a decision as to whether or not the ram lock should be released based upon the signals from the vehicle speed detector 61, the pedal operation detector 62 and the work operation detector 63, are also input to the input decision-making circuit 111. As the change-over switch 64 is switched to the auto position, the input decision-making circuit 111 makes a decision as to whether the immediately preceding ram lock output was on or off based upon the signals provided by the decision-making circuits 112 and 113. If it is decided that the previous ram lock signal output was off, ram lock decision-making processing to be detailed later is executed in the ram lock decision-making circuit 112, whereas if the previous ram lock signal output was on, lock release decision-making processing to be detailed later is executed in the lock release decision-making circuit 113.

A switch change-over circuit 114 executes switch change-over processing to be detailed later based upon the signals provided from the change-over switch 64 and the decision-making circuits 112 and 113 to set a switch therein to position (a) or position (b). If the switch is set to position (a), a ram lock engage signal is output from an output circuit 115, whereas if the switch is set to position (b), a ram lock release signal is output from an output circuit 116.

Figure 8:
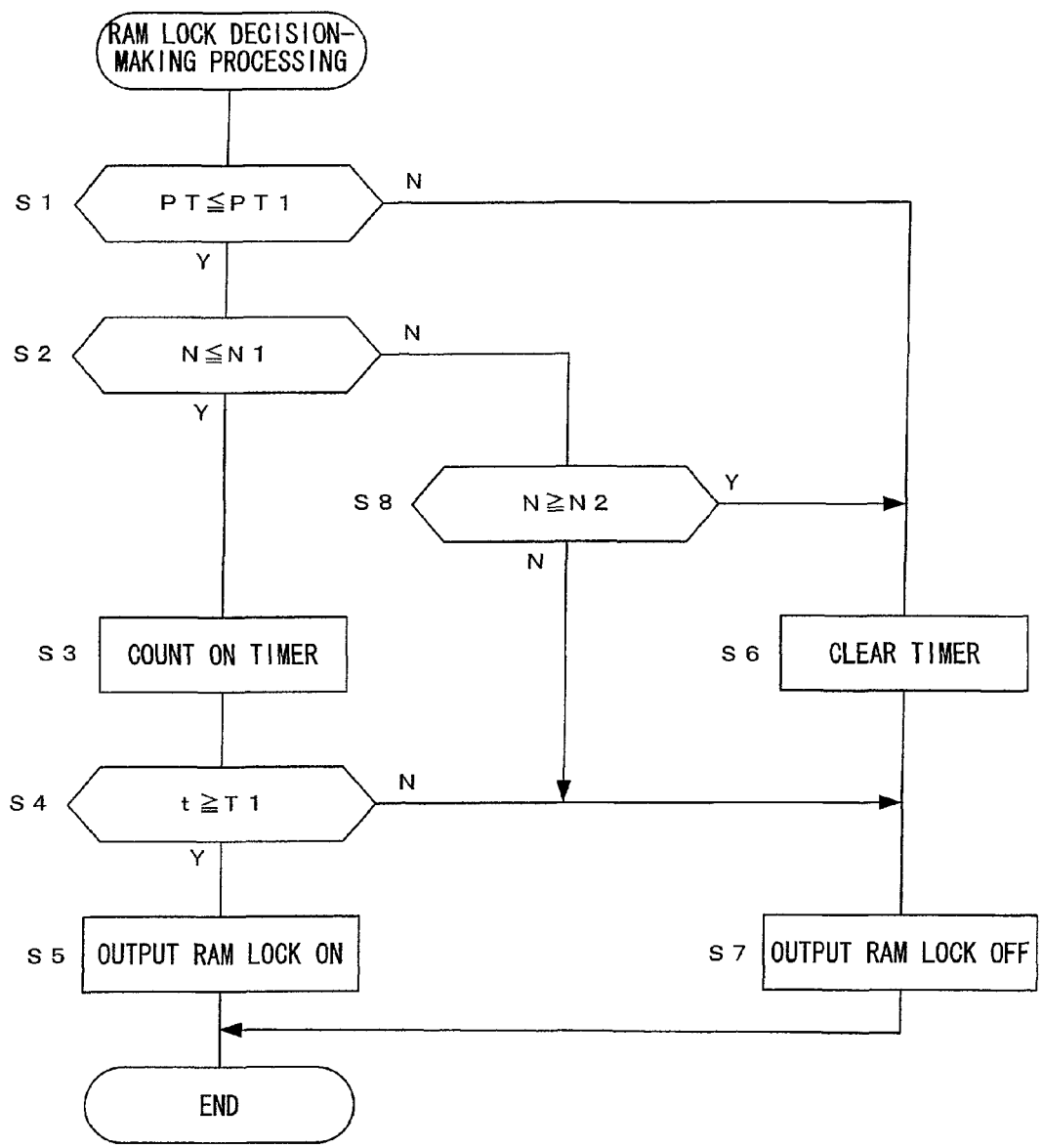
FIG. 8 is a flowchart of an example of processing that may be executed in a ram lock decision-making circuit in FIG. 7.

FIG. 8 presents a flowchart of an example of the ram lock decision-making processing that may be executed in the ram lock decision-making circuit 112. The processing in the flowchart is executed when the previous ram lock signal output was off. First, a decision is made in step S1 as to whether or not the detection value PT provided by the pedal operation detector 62 is equal to or less than the predetermined value PT1. This decision is made in order to judge whether or not the traveling pedal has been operated and the predetermined value PT1 is set by ensuring that an affirmative decision is made in step S1 if neither a forward operation nor a reverse operation has been performed. Upon making an affirmative decision in step S1, the operation proceeds to step S2 to make a decision as to whether or not the detection value N provided by the vehicle speed detector 61 is equal to or less than the predetermined value N1. This decision is made in order to judge whether or not the vehicle is in a stationary state or is traveling at low speed, equal to or less than a predetermined speed, and the predetermined value N1 is set by ensuring that an affirmative decision is made in step S2 if the vehicle speed is equal to or less than, for instance, 5 kph.

Upon making an affirmative decision in step S2, the operation proceeds to step S3 to count time on a timer. Then, a decision is made in step S4 as to whether or not the timer t engaged in the time count has counted a predetermined length of time T1 (e.g., approximately 5 sec). If an affirmative decision is made in step S4, the operation proceeds to step S5 to output a ram lock on signal. If, on the other hand, a negative decision is made in step S1, the operation proceeds to step S6 to clear the timer count (reset the timer) and then a ram lock off signal is output in step S7. If a negative decision is made in step S2, the operation proceeds to step S8 to make a decision as to whether or not the detection value N provided by the vehicle speed detector 61 is equal to or greater than the predetermined value N2. A value greater than the predetermined value N1 is selected for the predetermined value N2 (e.g., equivalent to a vehicle speed of 10 kph). If an affirmative decision is made in step S8, the operation proceeds to step S6 to clear the timer count, whereas if a negative decision is made in step S8, the operation proceeds to step S7 without clearing the timer count.

Figure 9:
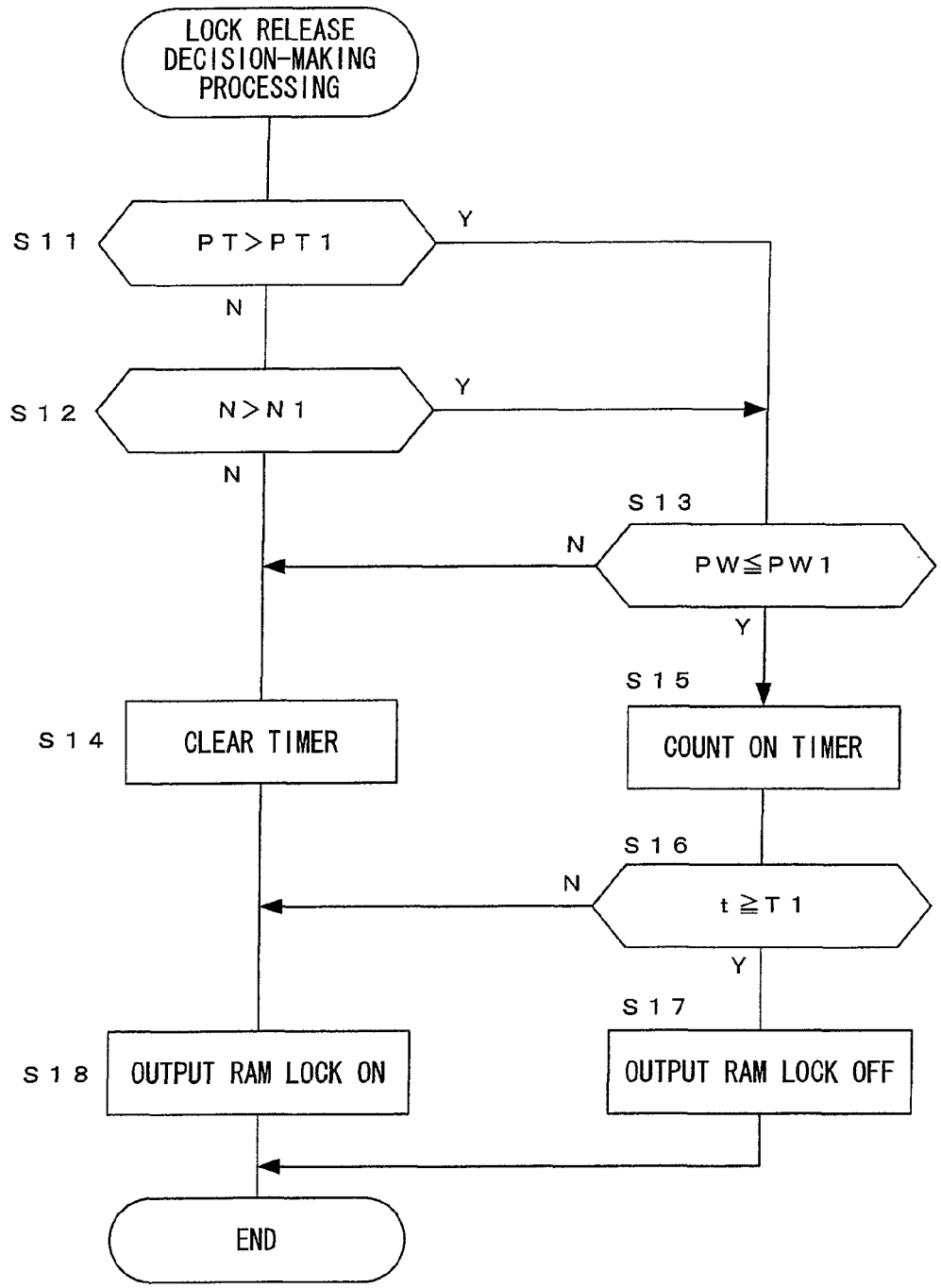
FIG. 9 is a flowchart of an example of processing that may be executed in a lock release decision-making circuit in FIG. 7.

FIG. 9 presents a flowchart of an example of the lock release decision-making processing that may be executed in the lock release decision-making circuit 113. The processing in the flowchart is executed when the previous ram lock signal output was on. First, in step S11, a decision is made as to whether or not the detection value PT provided by the pedal operation detector 62 is greater than the predetermined value PT1, i.e., whether or not a forward operation or a reverse operation has been performed at the traveling pedal. If an affirmative decision is made in step S11, the operation proceeds to step S13, whereas if a negative decision is made, the operation proceeds to step S12. In step S12, a decision is made as to whether or not the detection value N provided by the vehicle speed detector 61 is greater than the predetermined value N1, i.e., whether or not the vehicle is currently traveling at a speed higher than the predetermined speed. If an affirmative decision is made in step S12, the operation proceeds to step S13, whereas if a negative decision is made in step S12, the operation proceeds to step S14.

In step S13, a decision is made as to whether or not the detection value PW provided by the work operation detector 63 is equal to or less than the predetermined value PW1. This decision is made so as to judge whether or not the work operating lever has been operated, and the predetermined value PW1 is set by ensuring that an affirmative decision is made in step S13 if the work operating lever has not been operated. Upon making an affirmative decision in step S13, the operation proceeds to step S15 to count time on the timer and then a decision is made in step S16 as to whether or not the timer t engaged in the time count has counted the predetermined length of time T1. If an affirmative decision is made in step S16, the operation proceeds to step S17 to output a ram lock off signal. If, on the other hand, a negative decision is made in step S13, the operation proceeds to step S14 to clear (reset) the timer and then, a ram lock on signal is output in step S18. The operation also proceeds to step S18 if a negative decision is made in step S16.

Figure 10:
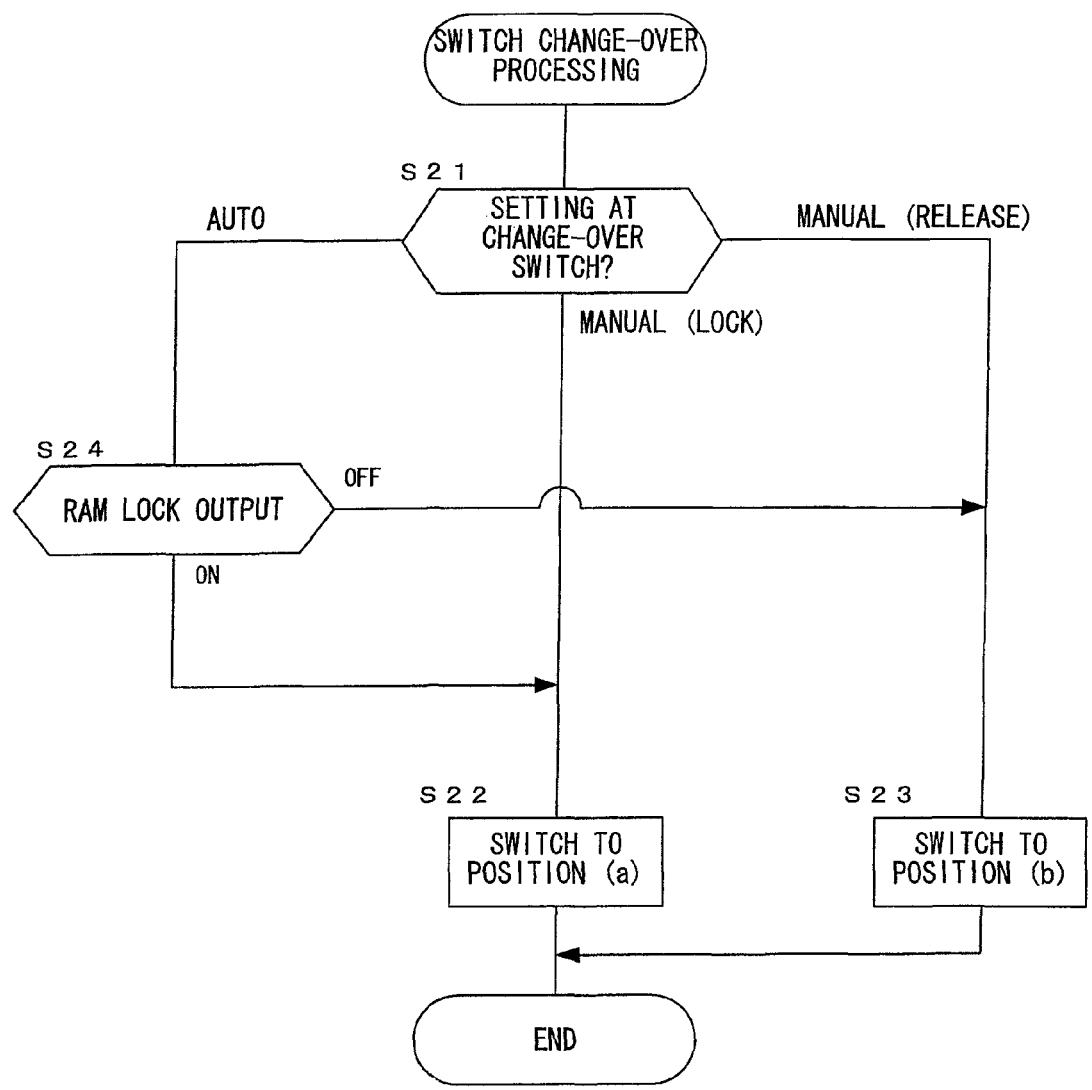
FIG. 10 is a flowchart presenting an example of processing that may be executed in a switch change-over circuit in FIG. 7.

FIG. 10 presents a flowchart of an example of the switch change-over processing that may be executed in the switch change-over circuit 114. The processing in this flowchart is repeatedly executed over predetermined time intervals. First, in step S21, the position of the change-over switch 64 is determined based upon a signal provided by the change-over switch 64. The operation proceeds to step S22 if it is decided in step S21 that the change-over switch is currently at the manual (lock) position. In step S22, the switch is switched to position (a). If it is decided in step S21 that the change-over switch is currently set at the manual (release) position, the operation proceeds to step S23 to switch the switch to position (b). If it is decided in step S21 that the change-over switch is currently at the auto position, the operation proceeds to step S24 to make a decision with regard to the outputs from the decision-making circuits 112 and 113. If it is decided in step S24 that a ram lock on signal has been output, the operation proceeds to step S22, whereas if it is decided that a ram lock off signal has been output, the operation proceeds to step S23.

The primary operation executed in the first variation is explained next.

The change-over switch 64 is switched to the auto position to automatically control the ram lock engagement. As the vehicle travels in this state in response to a traveling pedal operation, the ram lock decision-making circuit 112 outputs a ram lock off signal and the switch in the switch change-over circuit 114 is thus set to position (b) (step S7, step S23). As a result, a ram lock release signal is output to the solenoid controlled directional control valve 35 (see FIG. 4), thereby switching the solenoid controlled directional control valve 35 to position A to allow the ram cylinders 33 to extend/contract.

As the traveling pedal operation stops and the vehicle enters a stationary state or a low-speed traveling state (as the lock engage conditions are achieved), the timer is started up (step S3). After these conditions are sustained over the predetermined length of time T1, the ram lock decision-making circuit 112 outputs a ram lock on signal, thereby setting the switch in the switch change-over circuit 114 to position (a) (step S5, step S22). As a result, a ram lock engage signal is output to the solenoid controlled directional control valve 35, the solenoid controlled directional control valve 35 is switched to position B and the ram cylinders 33 become hydraulically locked. Thus, no complicated switch operation needs to be performed when locking the ram cylinders 33 and the excavating operation can be performed with greater ease. Since the ram cylinders are locked after the predetermined length of time T1 is counted as long as the traveling pedal is not operated and the vehicle speed remains equal to or less than the predetermined speed, the ram cylinders 33 are never locked unintentionally.

Even when the traveling pedal is operated and the vehicle is engaged in a traveling operation, i.e., even when the lock engage conditions are no longer satisfied, the ram locked state is sustained as long as the operating lever is operated. As a result, the excavating operation can be performed with the vehicle traveling at low-speed and maintaining a stable attitude. As the operation at the operating lever stops while the lock engage conditions are not satisfied (as lock release conditions are achieved), the timer is started up (step S15). After these conditions are sustained over the predetermined length of time T1, the lock release decision-making circuit 113 outputs a ram lock off signal and the switch in the switch change-over circuit 114 is set to position (b) (step S17, step S23). As a result, a lock release signal is output to the solenoid controlled directional control valve 35, the electromagnetic valve 35 is switched to position A and the ram lock is released. Thus, no complicated switch operation needs to be performed when releasing the ram lock.

The ram cylinders 33 can be set in a locked state at all times regardless of the vehicle traveling state by switching the change-over switch 64 to the manual (lock) position. In this case, the switch in the switch change-over circuit 114 is set to position (a) and the ram cylinders 33 are thus locked. In addition, the ram lock can be set in a released state at all times by switching the change-over switch 64 to the manual (release) position. In response, the switch in the switch change-over circuit 114 is set to position (b) thereby releasing the ram lock. Namely, regardless of the statuses of the signals output from the decision-making circuits 112 and 113, the ram lock can be engaged or released as desired by the operator by setting the change-over switch 64 to a specific position.

The following operational effects can be achieved in the first variation.

(1) When a state in which the traveling pedal is not operated ($PT \leq PT1$) and the vehicle speed is equal to or less than the predetermined value ($N \leq N1$) (lock engage conditions satisfied) is sustained over the predetermined length of time T1, the ram cylinders are locked. If a state in which the lock engage conditions are no longer satisfied after the ram cylinders become locked and the operating lever is not operated ($PW \leq PW1$) (lock release conditions satisfied) is sustained over the predetermined length of time T1, the ram lock is released. As a result, the need to perform any complicated operation to engage or release the ram lock is eliminated. In addition, even when the lock engage conditions are not satisfied, the ram lock is sustained as long as the operating lever is operated. As a result, the excavating operation can be performed with the vehicle traveling at low-speed and maintaining a stable attitude.

(2) Different requirements are set as the lock engage conditions and the lock release conditions, and a decision as to whether or not the operating lever has been operated is made only when releasing the lock. Thus, the ram lock can be engaged simply in response to a traveling pedal operation, regardless of whether or not the operating lever has been operated.

(3) The ram lock is engaged and released when the lock engage conditions and the lock release conditions are sustained over the predetermined length of time T1. In other words, the ram lock is not engaged or released even if the corresponding conditions are achieved momentarily and thus, the ram lock is never engaged or released unintentionally.

(4) The ram lock can be manually engaged or released by setting the change-over switch 64 to a specific position regardless of the vehicle conditions such as the vehicle speed, whether or not the traveling pedal is operated and whether or not the operating lever is operated. Thus, the ram lock engagement state can be freely adjusted in accordance to the operator's requirement.

—Second Variation—

While the ram lock release conditions include a condition whereby the operating lever is not operated in the first variation described above, the ram lock release conditions may instead include a condition whereby the difference between the pressures at the left and right ram cylinders 33 is equal to or less than a predetermined value. The alternative ram lock release condition is now explained.

Figure 11:
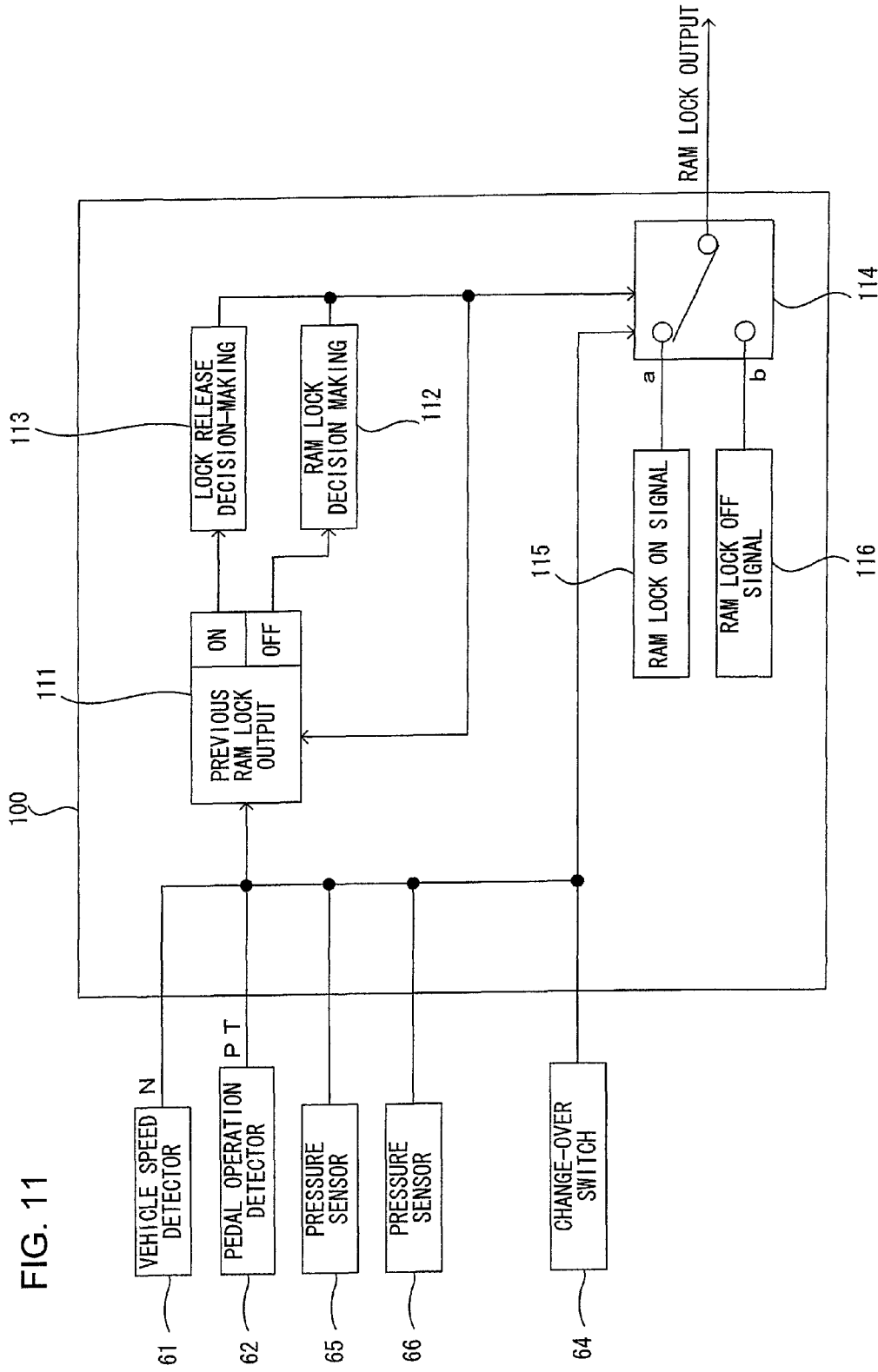
FIG. 11 is a block diagram of the structure adopted in a control device achieved as a second variation.
Figure 12:
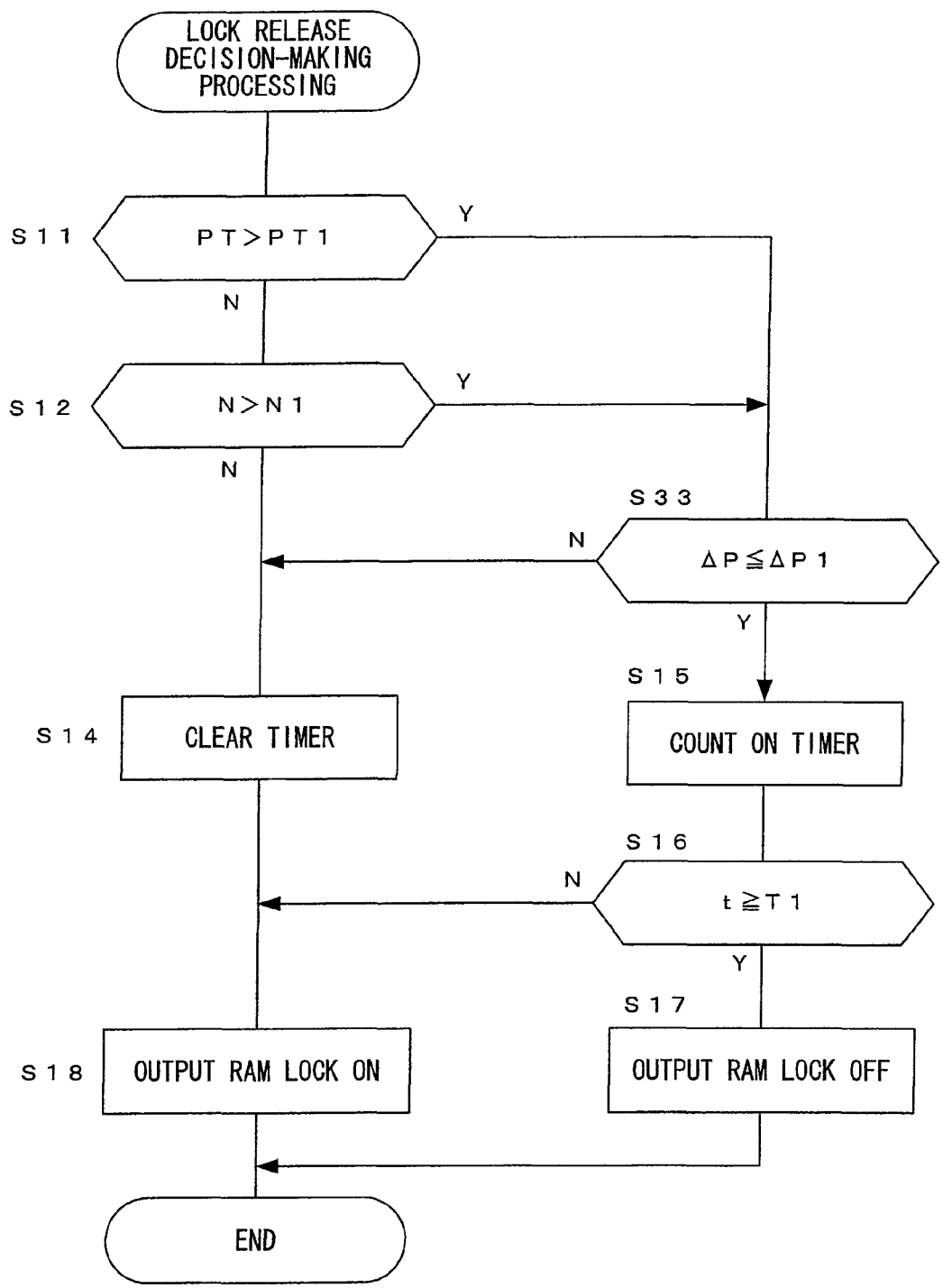
FIG. 12 is a flowchart of an example of processing that may be executed in a lock release decision-making circuit in FIG. 11.

FIG. 11 is a block diagram showing the structure adopted in a control device 100 achieved in the second variation and FIG. 12 presents a flowchart of the processing executed in the lock release decision-making circuit 113. It is to be noted that the same reference numerals are assigned to components identical to those in FIGS. 7 and 9 and the following explanation focuses on the differences from the first variation.

As shown in FIG. 11, the second variation includes pressure sensors 65 and 66, which respectively detect the pressures at the left and right ram cylinders 33, in place of the work detector 63. Upon making an affirmative decision in step S11 or step S12, i.e., after it is decided that the lock engage conditions are not satisfied, the operation proceeds to step S33 as shown in FIG. 12. In step S33, the pressure difference $\Delta p$ between the pressures at the left and right ram cylinders 33 is calculated based upon the signals provided from the pressure sensors 65 and 66 and a decision is made as to whether or not the pressure difference $\Delta p$ is equal to or less than a predetermined value $\Delta p1$. This decision is made in order to judge whether or not the vehicle body is likely to rock or tilt to the left or right based upon the pressure difference $\Delta p$, and the predetermined value $\Delta p1$ is set by ensuring that an affirmative decision is made in step S33 when the body is not likely to rock or tilt. If an affirmative decision is made in step S33, it is judged that the lock release conditions have been achieved and in this case, the operation proceeds to step S15 to count time on the timer. If, on the other hand, a negative decision is made in step S33, the timer is cleared in step S14.

As described above, after the ram cylinders 33 are initially locked, valid ram lock release conditions are recognized if the lock engage conditions are no longer satisfied and the pressure difference $\Delta p$ between the pressures at the left and right ram cylinders 33 are equal to or less than the predetermined value $\Delta p1$ in the second variation. Thus, the excavating operation can be performed with the vehicle maintaining a stable attitude without its body rocking to the left or the right in an undesirable manner. Namely, the ram lock engagement is sustained only when it is necessary to minimize the rocking motion of the vehicle and thus, the ram lock engagement state is kept to an absolute minimum. It is to be noted that the work detector 63 may be used to detect whether or not the operating lever has been operated as in the first variation and that conditions under which non-operation of the operating lever is detected via the work detector 63 and the pressure difference $\Delta p$ is equal to or less than the predetermined value $\Delta p1$ while the lock engage conditions are not satisfied may be set as the lock release conditions.

Figure 13:
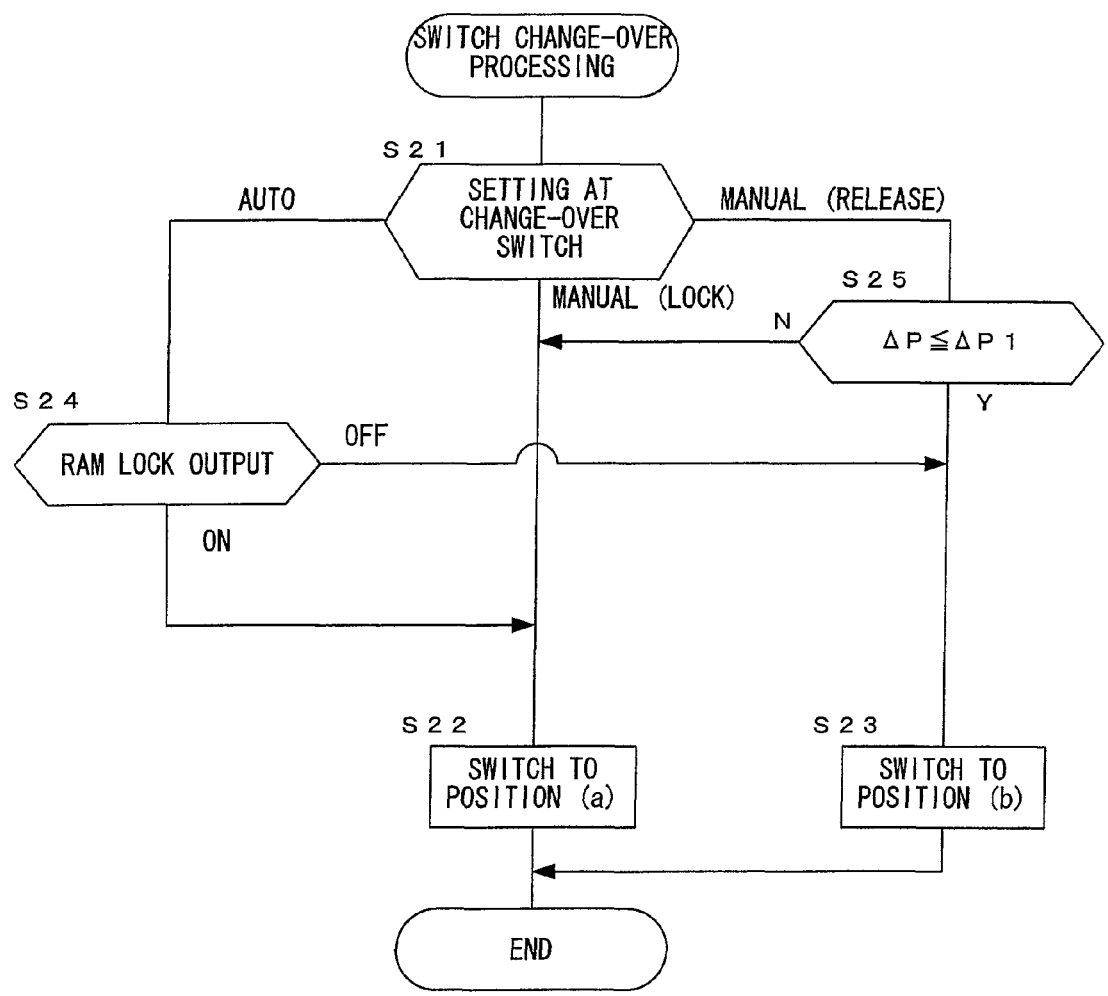
FIG. 13 is a flowchart presenting an example of processing that may be executed in a switch change-over circuit in FIG. 11.

In the second variation, provided that the pressure difference $\Delta p$ is greater than the predetermined value $\Delta p1$, the release operation may be disallowed even if the change-over switch 64 is set to the manual (release) position. An example of processing that may be executed in the switch change-over circuit 114 under such circumstances is presented in FIG. 13. It is to be noted that the same step numbers are assigned to steps in which processing identical to the corresponding steps in FIG. 10 is executed. In the processing shown in FIG. 13, the operation proceeds to step S25 upon deciding in step S21 that the change-over switch 64 is currently set at the manual (release) position. In step S25, a decision is made as to whether or not the pressure difference $\Delta p$ is equal to or less than the predetermined value $\Delta p1$, and the operation proceeds to step S23 upon making an affirmative decision, whereas the operation proceeds to step S22 upon making a negative decision. As a result, any undesirable rocking motion of the vehicle attributable to an operation by the operator is prevented.

—Third Variation—

Figure 14:
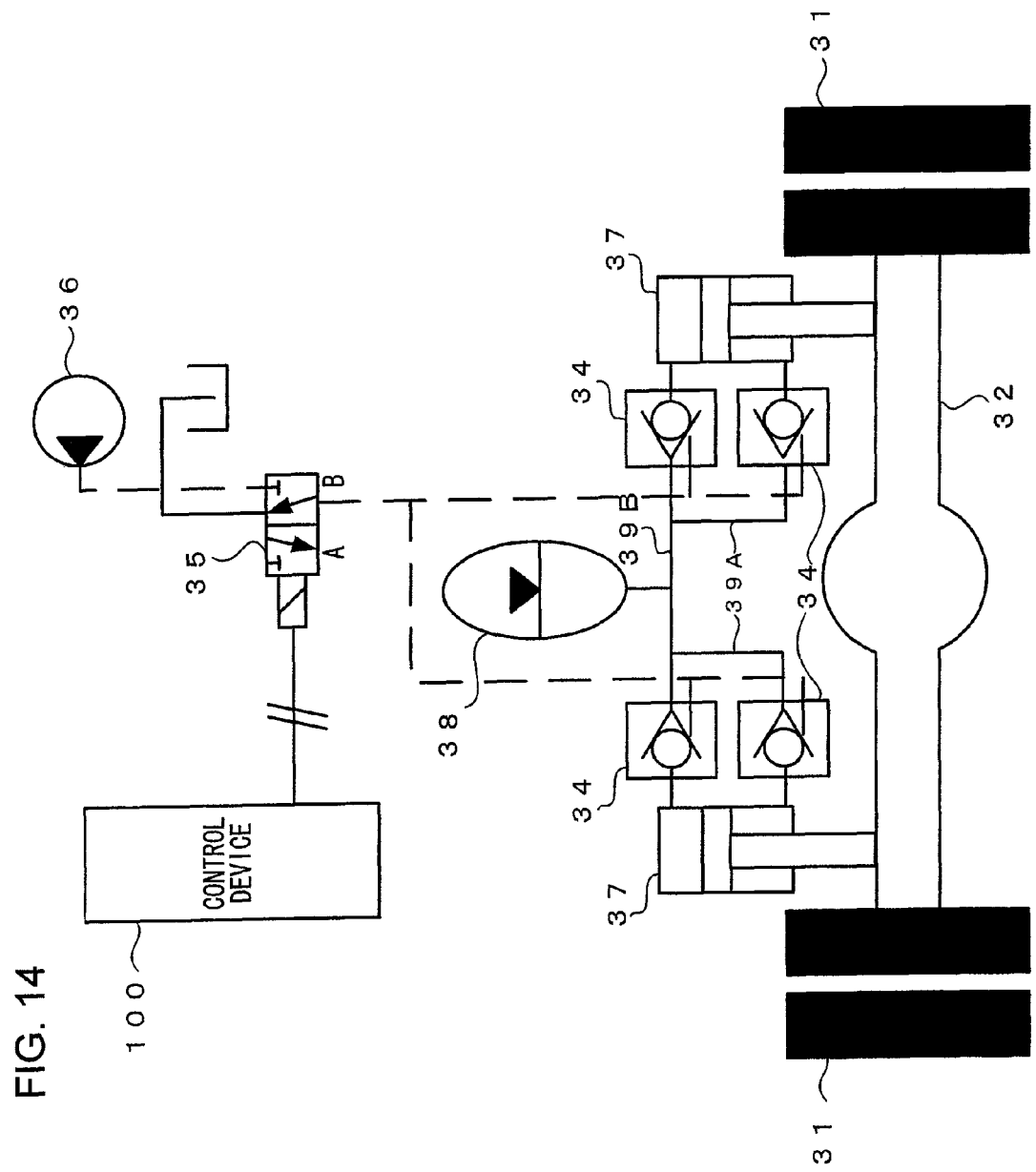
FIG. 14 is a hydraulic circuit diagram showing the structure adopted in a work vehicle control device achieved as a third variation.

While the ram cylinders 33 are used as hydraulic cylinders that support the wheels or the axle of the vehicle in the first variation, suspension cylinders may be used instead, as shown in FIG. 14. A variation that includes suspension cylinders is now explained. It is to be noted that in FIG. 14, the same reference numerals are assigned to components identical to those in FIG. 4, and the following explanation focuses on the differences.

A pair of suspension cylinders 37, one on the left side and the other on the right side, are disposed between the axle 32 and the body frame, as shown in FIG. 14. The suspension cylinders 37, each linked via pins or the like to the body frame on the cylinder tube side and to the axle 32 on the cylinder rod side, support the axle 32 while providing a buffer effect for the traveling vehicle. A bottom chamber and a rod chamber of each suspension cylinder 37 are made to communicate with each other via a pipeline 39A, and the pipelines 39A are both made to communicate with an accumulator 38 via a pipeline 39B. The pilot ports at the individual pilot check valves 34 are connected to the hydraulic pump 36 or a tank via the solenoid controlled directional control valve 35. It is to be noted that restrictors provided at the pipelines 39A and 39B with which the suspension performance level is adjusted are not shown in the figure.

The control device 100, which switches the solenoid controlled directional control valve 35, adopts a structure similar to that in the first variation. Namely, if conditions under which the traveling pedal is not operated and the vehicle speed is equal to or less than the predetermined speed (lock engage conditions) are sustained over the predetermined length of time T1, a lock engage signal is output to the solenoid controlled directional control valve 35, thereby setting the solenoid controlled directional control valve 35 to position B. This disallows any flow of the pressure oil out of the bottom chambers and the rod chambers at the suspension cylinders 37, and as the suspension cylinders 37 are not allowed to extend or contract, the excavating operation can be performed with a stable attitude.

If, on the other hand, conditions under which the valid lock engage conditions are no longer recognized while the lock is engaged and the operating lever is not operated (lock release conditions) are sustained over the predetermined length of time T1, a lock release signal is output to the solenoid controlled directional control valve 35, thereby switching the solenoid controlled directional control valve 35 to position A. Thus, the suspension cylinders are allowed to extend/contract, and, as the vibration from the road surface is absorbed at the accumulator 38, a comfortable ride is assured.

It is to be noted that while the traveling pedal can be operated for forward traveling and reverse traveling in the variations explained above, the vehicle may instead be switched to travel forward or reverse through an operation of a forward/reverse change-over switch. In addition, the lock is engaged and released when the predetermined length of time T1 elapses after the lock engage conditions and the lock release conditions are respectively achieved, the predetermined length of time T1 may be freely adjusted to the preference of the operator through, for instance, a dial operation. In other words, the lock engagement timing and the lock release timing can be customized in accordance with the operator's preference. It is to be noted that the predetermined length of time T1 may be 0, and in such a case, no timer is required.

The ram cylinders 33 may be locked and released under automatic control only when both the parking brake and the work brake are in a released state via the brake switch 25. In addition, any of the first through third variations described above may be adopted in conjunction with a system in which the brake is locked upon detecting depression of the brake pedal 1 to an extent equal to or greater than a predetermined value (e.g., the first embodiment), so as to engage and release the ram lock in response to a signal provided by the control device 10 (a brake signal, a brake release signal) as in the second embodiment.

Provided that the cylinders 33 or 37 are locked when the lock engage conditions under which the traveling pedal is not operated and the vehicle speed is equal to or less than the predetermined value are achieved and that the hydraulic lock is released when the lock engage conditions are not satisfied and the vehicle is not engaged in actual work, the control device 100 may assume a structure other than those described above. Also, as long as the cylinders 33 or 37 are locked when the lock engage conditions under which the traveling pedal is not operated and the vehicle speed is equal to or less than a predetermined value are achieved and that the hydraulic lock is released when the lock engage conditions are not satisfied and the pressure difference Δp between the pressures at the left and right cylinders is equal to or less than the predetermined value Δp1, the control device 100 may take on a structure other than those described above.

While the pair of ram cylinders 33 or suspension cylinders 37, one on the left side and the other on the right side, are disposed between the axle 32 and the body frame in the examples explained above, the hydraulic cylinders 33 or 37 may be disposed at different positions. For instance, the wheels may be directly supported by the hydraulic cylinders 33 or 37 instead of via the axle 32. While the cylinders 33 or 37 are hydraulically locked or released by switching the pilot check valves 34 in response to a change-over at the solenoid controlled directional control valve 35, the cylinder lock means may adopt a structure other than this. In addition, while a decision as to whether or not the vehicle is engaged in work is made by detecting the pilot pressure PW, corresponding to the extent to which the operating lever is operated, the work detection means may adopt a structure other than this. While the pressure difference between the pressures at the left and right ram cylinders 33 is detected via the pressure sensors 65 and 66, another cylinder pressure detection means may be utilized instead. While the hydraulic lock is manually engaged or released by setting the change-over switch 24 to a specific position, the structure of the manual lock control means is not limited to this example.

INDUSTRIAL APPLICABILITY

The present invention may be adopted in work vehicles other than a wheel excavator.

The disclosures of the following priority applications are herein incorporated by reference:
Japanese Patent Application No. 2004-184697
Japanese Patent Application No. 2004-172209

The invention claimed is:

1. A control device for a work vehicle, comprising:
a hydraulic brake device that generates a braking force corresponding to a brake pedal operation performed while the vehicle is traveling;
a brake lock unit that applies and releases a hydraulic lock on the hydraulic brake device;
a brake pedal operation detection unit that detects an operation of the brake pedal;
a brake lock control unit that controls the brake lock unit so as to apply the hydraulic lock on the hydraulic brake device upon detecting via the brake pedal operation detection unit a predetermined depressing operation of the brake pedal;
a ram cylinder that supports an axle of the vehicle;
a cylinder lock unit that applies and releases a hydraulic lock on the ram cylinder so that the axle is not allowed to rock when the ram cylinder is in a lock engaged state and is allowed to rock when the ram cylinder is in a lock released state;
a traveling pedal operation detection unit that detects an operation of a traveling pedal;
a vehicle speed detection unit that detects a vehicle speed; and
a cylinder lock control unit that controls the cylinder lock unit so as to apply the hydraulic lock on the ram cylinder when lock engage conditions under which non-operation at the traveling pedal is detected by the traveling pedal operation detection unit and the vehicle speed detection unit detects that the vehicle is in a stationary state or is traveling at a speed equal to or lower than a predetermined speed are achieved, and so as to release the hydraulic lock on the ram cylinder only after the hydraulic lock on the hydraulic brake device is released by the brake lock unit.

2. A control device for a work vehicle according to claim 1, wherein:
the cylinder lock control unit controls the cylinder lock unit so as to apply the hydraulic lock on the ram cylinder as the hydraulic brake device becomes hydraulically locked.

3. A control device for a work vehicle according to claim 1, wherein:
the ram cylinder has its oil chamber connected to a tank.

4. A control device for a work vehicle according to claim 1, wherein:
the cylinder lock control unit controls the cylinder lock unit so as to apply the hydraulic lock on the ram cylinder if a state, in which non-operation at the traveling pedal is detected by the traveling pedal operation detection unit and the vehicle speed detection unit detects that the vehicle is in a stationary state or is traveling at a speed equal to or lower than the predetermined speed, is sustained over a predetermined length of time.

5. A control device for a work vehicle according to claim 1, further comprising:
a work detection unit that detects whether or not the vehicle is engaged in work, wherein:
the cylinder lock control unit controls the cylinder lock unit such that the hydraulic lock having been applied on the ram cylinder under the lock engage conditions is subsequently released if the lock engage conditions are no longer satisfied and the work detection unit detects that the vehicle is not engaged in work.

6. A control device for a work vehicle according to claim 1, wherein:
the ram cylinder is one of a pair of ram cylinders, one disposed on a left and another disposed on a right; further comprising:
a cylinder pressure detection unit that detects a pressure at each of the ram cylinders, wherein:
the cylinder lock control unit controls the cylinder lock unit such that the hydraulic lock having been applied on the ram cylinders under the lock engage conditions is subsequently released if the lock engage conditions are no longer satisfied and a pressure difference between the pressures at the ram cylinders detected by the cylinder pressure detection unit is equal to or less than a predetermined value.

7. A control device for a work vehicle according to claim 6, further comprising:
a manual lock control unit that manually controls the cylinder lock unit by invalidating control executed by the cylinder lock control unit, wherein:

as a lock engage command is issued by the manual lock control unit, the ram cylinders are locked regardless of whether or not the lock engage conditions are achieved, and in response to a lock release command issued by the manual lock control unit, the hydraulic lock on the ram cylinders is released at least if the pressure difference between the pressures at the ram cylinders is equal to or less than the predetermined value.

8. A control device for a work vehicle according to claim 1, further comprising:
- a selection member used to select one of a brake engaged state and a brake released state for a work brake function and a parking brake function, wherein:
- the brake lock control unit controls the brake lock unit such that when the brake released state is selected for the work brake function and the parking brake function with the selection member, the hydraulic brake device is hydraulically locked upon detecting via the brake pedal operation detection unit the predetermined depressing operation of the brake pedal so that as a brake state other than the brake released state is subsequently selected for the work brake function and the parking brake function and then the brake released state is selected for the work brake function and the parking brake function via the selection member, the hydraulic lock on the hydraulic brake device is released, and
- the cylinder lock control unit controls the cylinder lock unit such that once the hydraulic lock is applied to the ram cylinder following the hydraulic lock on the hydraulic brake device, the hydraulic lock on the ram cylinder is not released unless the hydraulic lock on the hydraulic brake device is first released.

\* \* \* \* \*